US012069586B2

(12) United States Patent
Papasakellariou

(10) Patent No.: US 12,069,586 B2
(45) Date of Patent: Aug. 20, 2024

(54) POWER CONTROL FOR PUCCH TRANSMISSION WITH ACKNOWLEDGEMENT INFORMATION

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 17/651,889

(22) Filed: Feb. 21, 2022

(65) Prior Publication Data

US 2022/0279454 A1  Sep. 1, 2022

Related U.S. Application Data

(60) Provisional application No. 63/244,890, filed on Sep. 16, 2021, provisional application No. 63/155,030, filed on Mar. 1, 2021.

(51) Int. Cl.
*H04W 52/14* (2009.01)
*H04L 1/1829* (2023.01)
(Continued)

(52) U.S. Cl.
CPC ......... *H04W 52/146* (2013.01); *H04L 1/1861* (2013.01); *H04W 52/08* (2013.01); *H04W 72/23* (2023.01)

(58) Field of Classification Search
CPC ... H04L 5/0055; H04L 1/1819; H04L 1/1854; H04L 1/0061; H04L 1/1614;
(Continued)

(56) References Cited

U.S. PATENT DOCUMENTS

2012/0099545 A1   4/2012   Han et al.
2013/0272157 A1   10/2013  Gao et al.
(Continued)

FOREIGN PATENT DOCUMENTS

WO   2012053863 A2   4/2012

OTHER PUBLICATIONS

"5G; NR; Physical channels and modulation (3GPP TS 38.211 version 16.4.0 Release 16)", ETSI TS 138 211 V16.4.0, Jan. 2021, 137 pages.
(Continued)

*Primary Examiner* — Golam Sorowar

(57) ABSTRACT

Apparatuses and methods for power determination for physical uplink control channel transmission with acknowledgement information. A method for operating a user equipment (UE) includes determining a sum of: a first number of received transport blocks (TBs) associated with a first set of radio network temporary identifiers (RNTIs), a second number of received TBs associated with a second set of RNTIs, and a third number of non-received TBs associated with the second set of RNTIs. The method further includes determining a power for a physical uplink control channel (PUCCH) transmission based on the sum and transmitting the PUCCH using the power. The PUCCH includes first hybrid automatic repeat request acknowledgement (HARQ-ACK) information bits associated with the first set of RNTIs and second HARQ-ACK information bits associated with the second set of RNTIs.

20 Claims, 14 Drawing Sheets

(51) Int. Cl.
*H04W 52/08* (2009.01)
*H04W 72/23* (2023.01)

(58) Field of Classification Search
CPC ..... H04L 1/1822; H04L 5/001; H04L 5/0053; H04L 1/1861; H04L 1/1812; H04L 1/1864; H04L 5/00; H04L 1/1671; H04L 1/0038; H04L 1/1896; H04L 1/0003; H04L 1/1887; H04L 1/0009; H04L 1/08; H04L 1/1607; H04L 1/0031; H04L 1/1825; H04L 1/1893; H04L 5/0023; H04L 1/06; H04L 1/1816; H04L 2001/0093; H04L 2025/03414; H04L 2025/03426; H04W 72/23; H04W 76/27; H04W 72/21; H04W 72/20; H04W 52/242; H04W 52/325; H04W 72/044; H04W 52/146; H04W 52/38; H04W 52/365; H04W 52/40; H04W 72/0473; H04W 72/1268; H04W 74/0833; H04W 88/08; H04W 72/04; H04W 80/08; H04W 88/02; H04W 4/06; H04W 72/0446; H04W 72/1263; H04W 72/1273; H04W 12/06; H04W 12/065; H04W 12/63; H04W 24/08; H04W 4/021; H04W 4/029

See application file for complete search history.

(56) References Cited

U.S. PATENT DOCUMENTS

| | | | |
|---|---|---|---|
| 2014/0029538 A1 | 1/2014 | Yang et al. | |
| 2015/0358924 A1 | 12/2015 | Papasakellariou | |
| 2020/0252167 A1* | 8/2020 | Kwak | H04L 1/1812 |
| 2021/0185609 A1* | 6/2021 | Zhou | H04L 69/28 |
| 2021/0266106 A1* | 8/2021 | Yan | H04L 1/1822 |
| 2022/0045805 A1* | 2/2022 | Karaki | H04L 1/1864 |
| 2022/0256573 A1* | 8/2022 | Frenne | H04L 5/0053 |

OTHER PUBLICATIONS

"5G; NR; Multiplexing and channel coding (3GPP TS 38.212 version 16.4.0 Release 16)", ETSI TS 138 212 V16.4.0, Jan. 2021, 155 pages.
"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
"5G; NR; Radio Resource Control (RRC); Protocol specification (3GPP TS 38.331 version 16.3.1 Release 16)", ETSI TS 138 331 V16.3.1, Jan. 2021, 916 pages.
"3rd Generation Partnership Project; Technical Specification Group Radio Access Network; NR; Physical channels and modulation (Release 16)", 3GPP TS 38.211 V16.6.0, Jun. 2021, 134 pages.
"3rd Generation Partnership Project; Technical Specification Group Radio Access Network; NR; Multiplexing and channel coding (Release 16)", 3GPP TS 38.212 V16.6.0, Jun. 2021, 153 pages.
"3rd Generation Partnership Project; Technical Specification Group Radio Access Network; NR; Physical layer procedures for control (Release 16)", 3GPP TS 38.213 V16.6.0, Jun. 2021, 187 pages.
"3rd Generation Partnership Project; Technical Specification Group Radio Access Network; NR; Physical layer procedures for data (Release 16)", 3GPP TS 38.214 V16.6.0, Jun. 2021, 172 pages.
"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.
"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.
International Search Report and Written Opinion issued Jun. 9, 2022 regarding Application No. PCT/KR2022/002890, 7 pages.

* cited by examiner

POWER CONTROL FOR PUCCH TRANSMISSION WITH ACKNOWLEDGEMENT INFORMATION

CROSS-REFERENCE TO RELATED APPLICATION AND CLAIM OF PRIORITY

This application claims priority under 35 U.S.C. § 119(e) to U.S. Provisional Patent Application No. 63/155,030 filed on Mar. 1, 2021 and U.S. Provisional Patent Application No. 63/244,890 filed on Sep. 16, 2021. The above-identified provisional patent applications are hereby incorporated by reference in their entirety.

TECHNICAL FIELD

The present disclosure relates generally to wireless communication systems and, more specifically, the present disclosure relates to power determination and control for physical uplink control channel (PUCCH) transmission with acknowledgement information.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to power determination and control for physical uplink control channel transmission with acknowledgement information.

In one embodiment, a method is provided. The method includes determining a sum of: a first number of received transport blocks (TBs) associated with a first set of radio network temporary identifiers (RNTIs), a second number of received TBs associated with a second set of RNTIs, and a third number of non-received TBs associated with the second set of RNTIs. The method further includes determining a power for a PUCCH transmission based on the sum and transmitting the PUCCH using the power. The PUCCH includes first hybrid automatic repeat request acknowledgement (HARQ-ACK) information bits associated with the first set of RNTIs and second HARQ-ACK information bits associated with the second set of RNTIs.

In another embodiment, a user equipment (UE) is provided. The UE includes a processor configured to determine a sum of: a first number of received TBs associated with a first set of RNTIs, a second number of received TBs associated with a second set of RNTIs, and a third number of non-received TBs associated with the second set of RNTIs; and determine a power for a PUCCH transmission based on the sum. The PUCCH includes first HARQ-ACK information bits associated with the first set of RNTIs and second HARQ-ACK information bits associated with the second set of RNTIs. The UE further includes a transceiver operably coupled to the processor. The transceiver is configured to transmit the PUCCH using the power.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
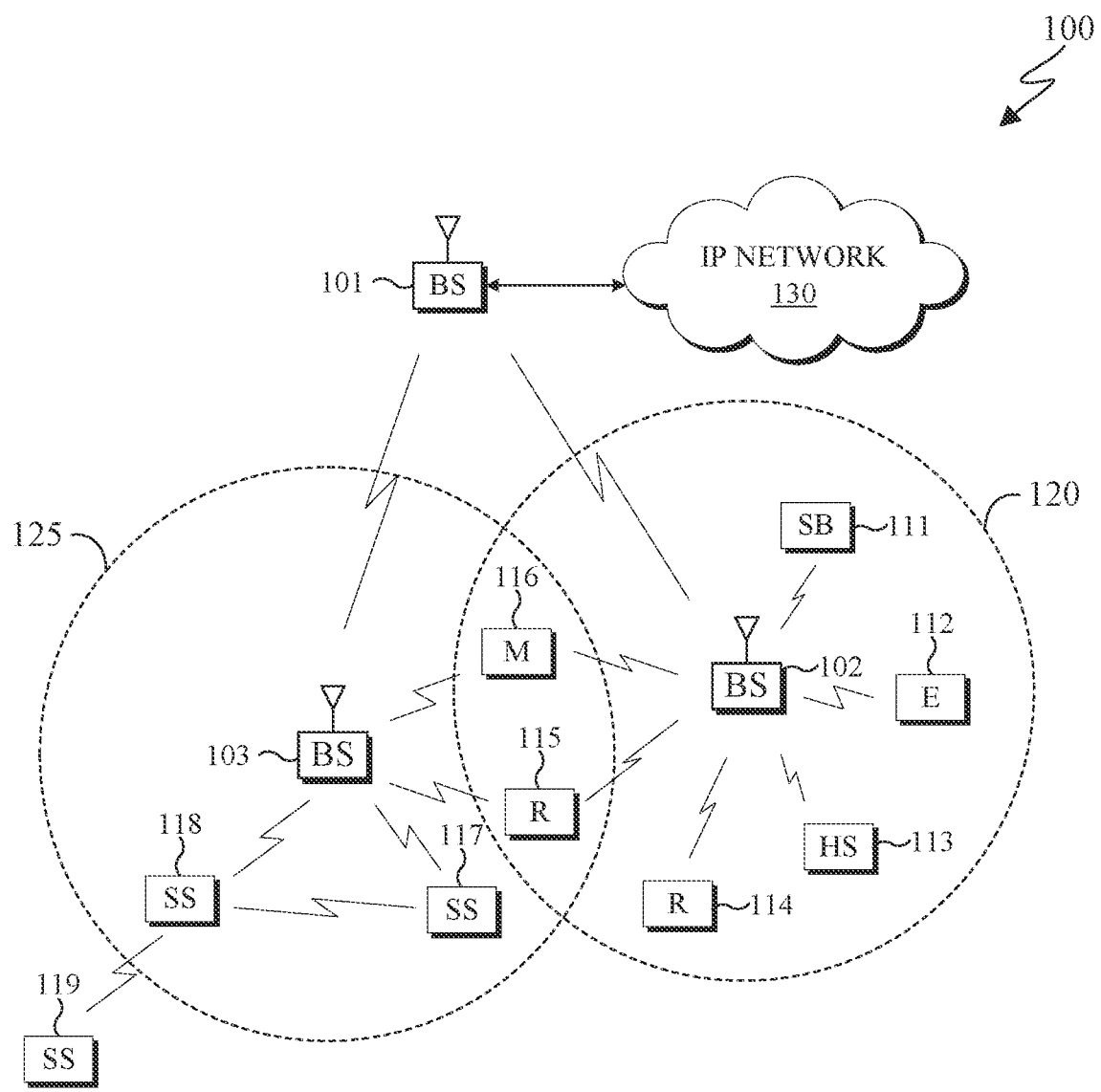
FIG. 1 illustrates an example wireless network according to embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.4.0 and v16.6.0, "NR; Physical channels and modulation"; 3GPP TS 38.212 v16.4.0 and v16.6.0, "NR; Multiplexing and Channel coding"; 3GPP TS 38.213 v16.4.0 and v16.6.0, "NR; Physical Layer Procedures for Control"; 3GPP TS 38.214 v16.4.0 and v16.6.0, "NR; Physical Layer Procedures for Data"; 3GPP TS 38.321 v16.3.0 and v16.5.0, "NR; Medium Access Control (MAC) protocol specification"; and 3GPP TS 38.331 v16.3.1 and v16.5.0, "NR; Radio Resource Control (RRC) Protocol Specification".

The present disclosure relates generally determining a transmission power of a physical uplink control channel (PUCCH) with hybrid automatic repeat request acknowledgement (HARQ-ACK) information from a user equipment to a base station. Additionally, the present disclosure relates generally to multiplexing unicast and multicast control information and determining a power for a (PUCCH) transmission with multicast HARQ-ACK information from a user equipment to a base station.

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals.

Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
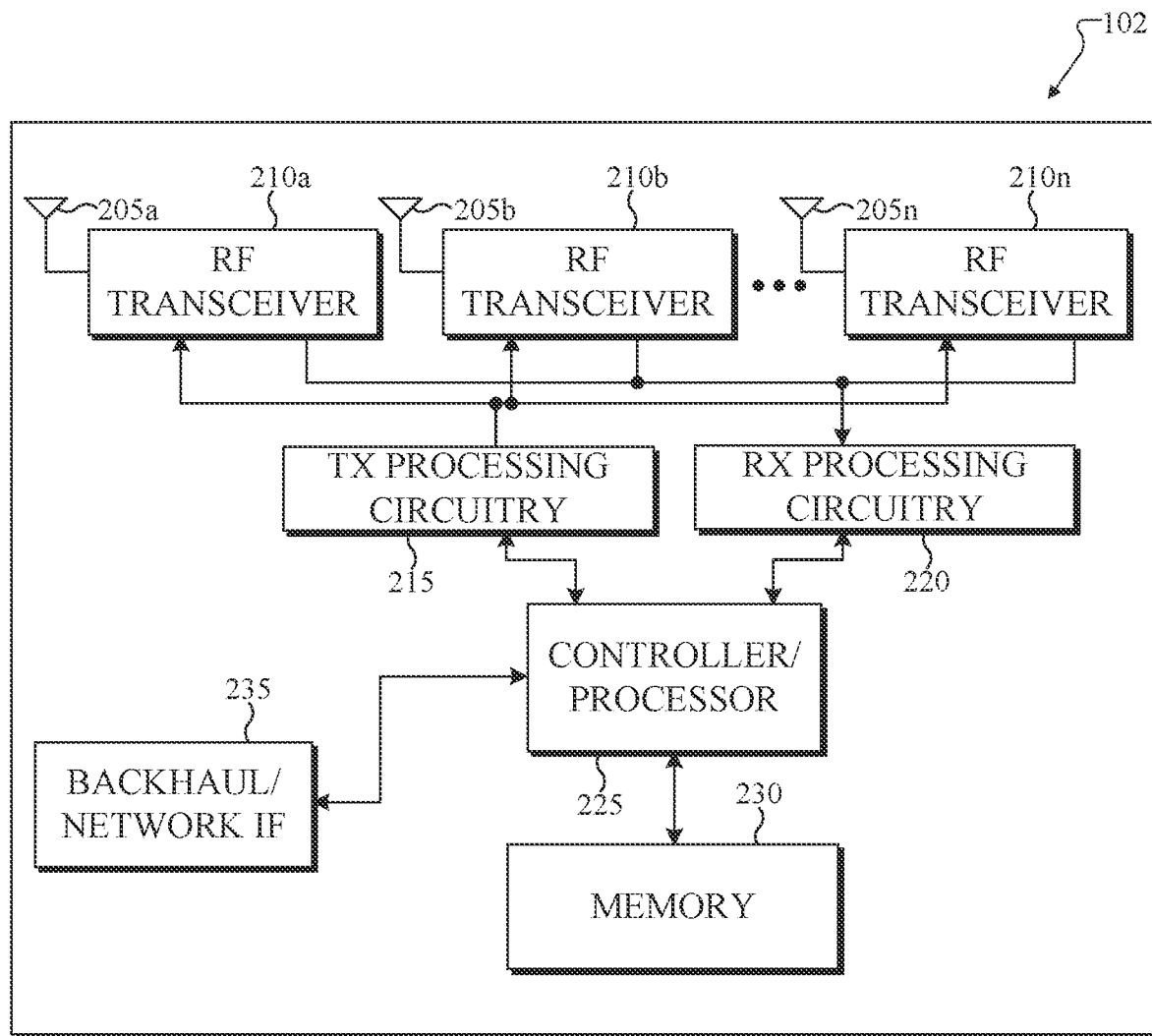
FIG. 2 illustrates an example base station (BS) according to embodiments of the present disclosure.
Figure 3:
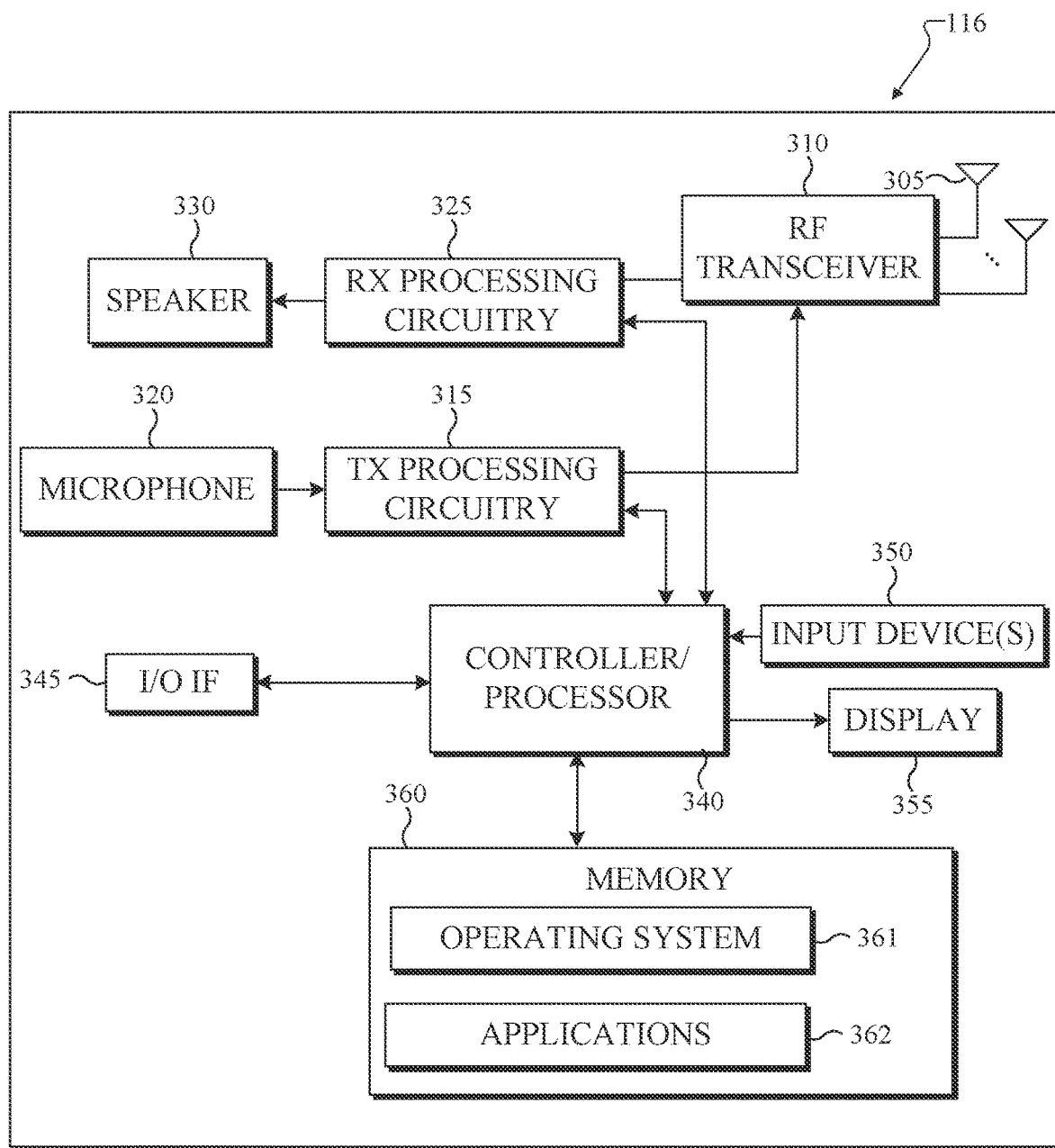
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (gNB) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-119 include circuitry, circuitry, programing, or a combination thereof for power determination and control for PUCCH transmission with acknowledgement information. In certain embodiments, and one or more of the BSs 101-103 includes circuitry, programing, or a combination thereof for power determination and control for PUCCH transmission with acknowledgement information.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support power determination and control for PUCCH transmission with acknowledgement information. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports power determination and control for PUCCH transmission with acknowledgement information. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BS s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
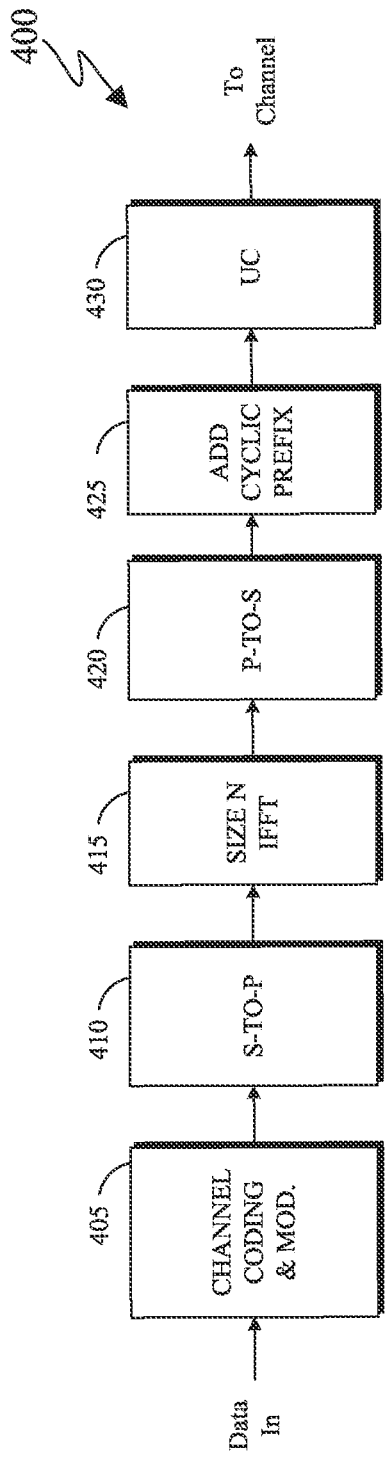
FIGS. 4 and 5 illustrate example wireless transmit and receive paths according to embodiments of the present disclosure.
Figure 5:
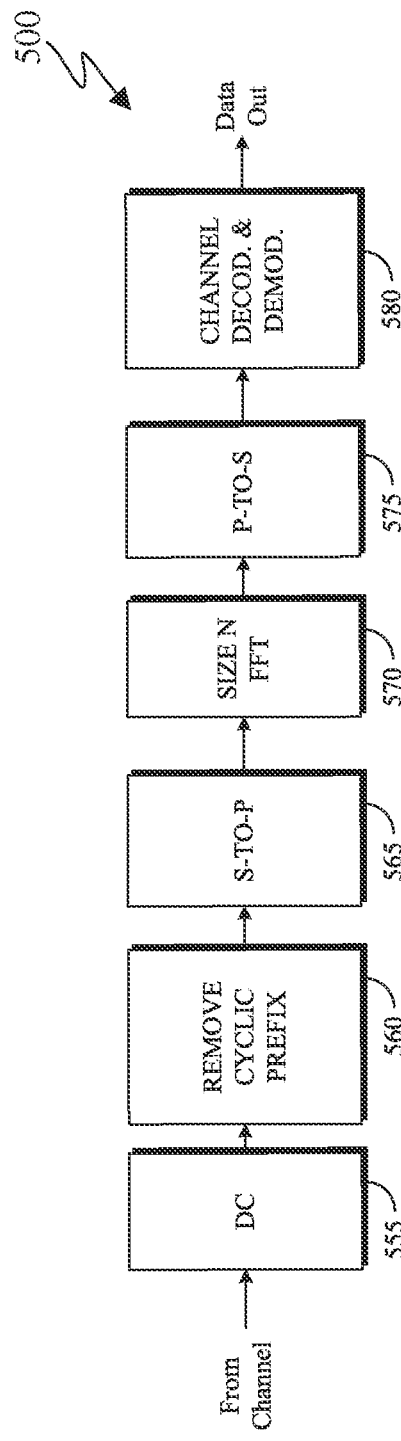

FIG. 4 and FIG. 5 illustrate example wireless transmit and receive paths according to embodiments of this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support power determination and control for PUCCH transmission with acknowledgement information as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In the following, an italicized name for a parameter can imply that the parameter is provided by higher layers. The term "higher layers" can be used to denote control information that a UE is provided in a PDSCH reception such as a RRC or a MAC CE.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{\mu} \cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective PDSCHs or physical DL control channels (PDCCHs). A PDSCH or a PDCCH can be transmitted over a variable number of slot symbols including one slot symbol.

A PDCCH transmission is over a number of control channel elements (CCEs) from a predetermined set of numbers of CCEs referred to as CCE aggregation level. A PDSCH transmission is scheduled by a DCI format or is semi-persistently scheduled (SPS) as configured by higher layers and activated by a DCI format.

A PDSCH reception by a UE provides one or more transport blocks (TB s), wherein a TB is associated with a hybrid automatic repeat request (HARQ) process that is indicated by a HARQ process number field in a DCI format scheduling the PDSCH reception or activating a SPS PDSCH reception. A TB transmission can be an initial one or a retransmission as identified by a new data indicator (NDI) field in the DCI format scheduling a PDSCH reception that provides a TB retransmission for a given HARQ process number.

In certain embodiments, a gNB (such as the BS 102) transmits one or more of multiple types of reference signals (RS) including channel state information RS (CSI-RS) and demodulation RS (DMRS).

A CSI-RS is intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF 3). The CSI-IM resources can also be associated with a zero power CSI-RS (ZP CSI-RS) configuration. A UE can determine CSI-RS reception parameters through DL control signaling or higher layer signaling, such as radio RRC signaling from a gNB (see also REF 5). A DMRS is typically transmitted within a BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also REF 1). A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request acknowledgement (HARQ-ACK) information, indicating correct or incorrect decoding of transport blocks (TB s) or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE can transmit a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value. A UE multiplexes HARQ-ACK information in a slot indicated by a value of PDSCH-to-HARQ_feedback timing indicator field in the DCI format, from a set of slot timing values $K_1$, or indicated by higher layers in case of a SPS PDSCH reception.

UL RS includes DMRS and SRS. DMRS is typically transmitted within a BW of a respective PUSCH or PUCCH. A gNB can use a DMRS to demodulate information in a respective PUSCH or PUCCH. SRS is transmitted by a UE to provide a gNB with an UL CSI and, for a TDD system, to also provide a precoding matrix indicator (PMI) for DL transmission. Further, as part of a random access procedure or for other purposes, a UE can transmit a physical random access channel (PRACH).

DL receptions and UL transmissions by a UE can be configured to occur in a corresponding DL bandwidth part (BWP) and UL BWP. A DL/UL BWP is smaller than or equal to a DL/UL bandwidth of a serving cell. In certain embodiments, groupcast PDSCH receptions can occur in a common frequency region for a group of UEs, wherein the common frequency region is within an active DL BWP for each UE from the group of UEs. DL transmissions from a BS (such as the BS 102) and UL transmissions from a UE (such as the UE 116) can be based on an orthogonal frequency division multiplexing (OFDM) waveform including a variant using DFT precoding that is known as DFT-spread-OFDM.

Figure 6:
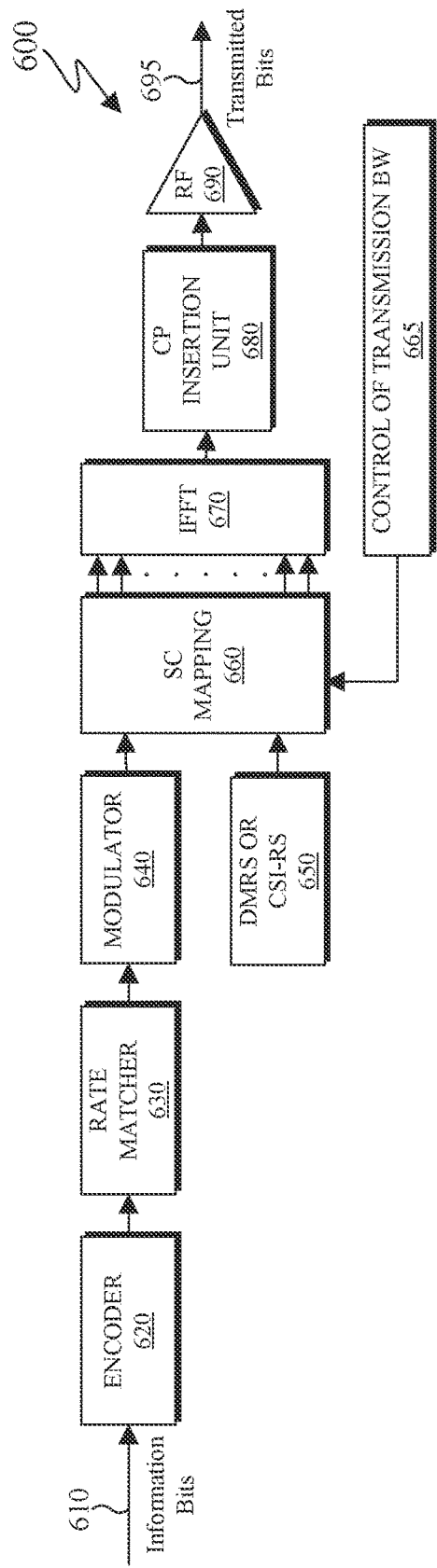
FIG. 6 illustrates a block diagram of an example transmitter structure using orthogonal frequency division multiplexing (OFDM) according to embodiments of the present disclosure.
Figure 7:
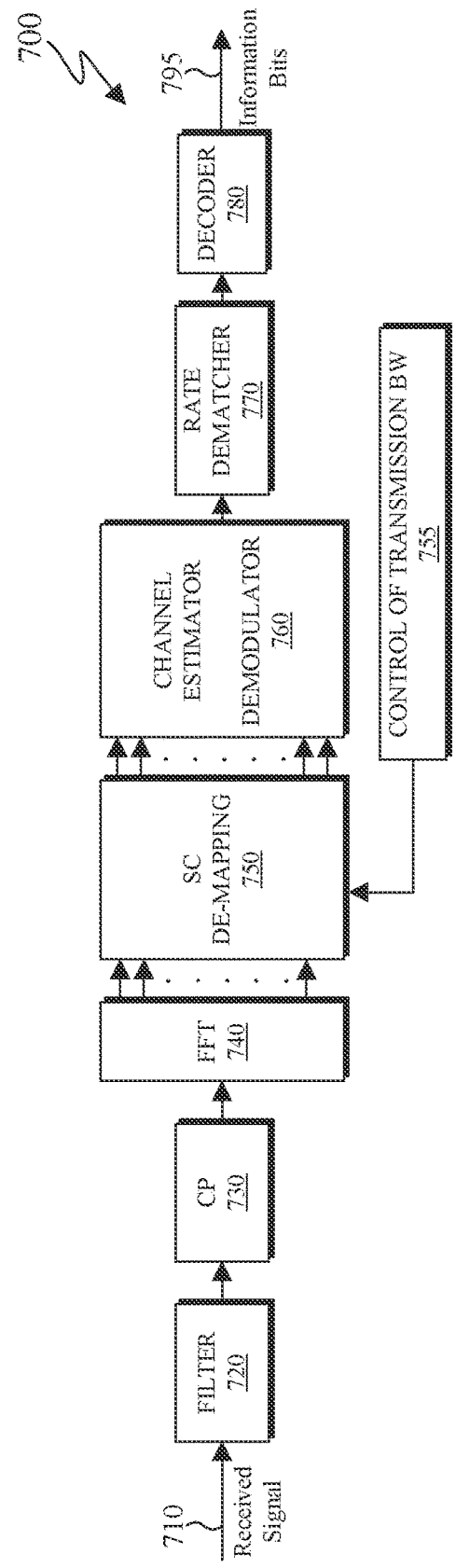
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630, and modulated by modulator 640. Subsequently, modulated encoded symbols and demodulation reference signal (DMRS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) reports report HARQ-ACK information in response to correct or incorrect detection of a DCI format together with HARQ-ACK information in response to correct of incorrect detection of TB s. For example, the HARQ-ACK information for a detection of a DCI format can be for a DCI format indicating an SPS PDSCH release or for a DCI format indicating a dormant/non-dormant BWP for a cell from a group of cells, and so on. A UE can also be configured to report HARQ-ACK information for a configured number of CB Gs per TB as described in REF 3. For brevity, unless explicitly otherwise mentioned, only HARQ-ACK information in response to correct or incorrect reception of TB s is subsequently considered but it should be understood that HARQ-ACK information can also be in response to additional reception outcomes. The HARQ-ACK information report can be based on one of several codebook types such as a Type-1 HARQ-ACK codebook or a Type-2 HARQ-ACK codebook or a Type-2 HARQ-ACK codebook as described in REF 3.

A serving gNB (such as BS 102) can provide, by higher layer signaling to a UE (such as the UE 116), a number of PUCCH resource sets for the UE to determine a PUCCH resource and a PUCCH resource from the PUCCH resource set for transmission of HARQ-ACK information as described in REF 3. To enable flexible allocation of PUCCH resources, a PUCCH resource indicator field, with fixed or configurable size, can be included in a DCI format scheduling a PDSCH reception and a UE can then determine a PUCCH resource based on a value of the field. The UE determines a PUCCH resource based on a value of a PUCCH resource indicator field in a last DCI format that the UE correctly receives and generates corresponding HARQ-ACK information that is included in a PUCCH transmission using the PUCCH resource. The last DCI format is provided by a PDCCH reception that starts after all other PDCCH receptions providing DCI formats with corresponding HARQ-ACK information multiplexed in a same PUCCH. In case of multiple PDCCH receptions that provide DCI formats scheduling PDSCH receptions on respective multiple cells and start at a same symbol after all other PDCCH receptions providing DCI formats with corresponding HARQ-ACK information multiplexed in a same PUCCH, the last PDCCH reception is the one corresponding to a cell from the multiple cells with a largest cell index. In case the DCI formats indicate a priority for the HARQ-ACK information, the last DCI format is among DCI formats indicating a same priority.

In certain embodiments, a UE (such as the UE 116) determines a PUCCH transmission power $P_{PUCCH,b,f,c}$ on an active UL BWP b of carrier f in a cell c using PUCCH power control adjustment state with index l as described in Equation (1).

$$P_{PUCCH,b,f,c} = \min\begin{cases} P_{CMAX,f,c} \\ P_{O_{PUCCH,b,f,c}} + 10\log_{10}(2^\mu \cdot M_{RB,b,f,c}^{PUCCH}) + \\ PL_{b,f,c} + \Delta_{F_{PUCCH}} + \Delta_{TF,b,f,c} + g_{b,f,c}(l) \end{cases} [dBm] \quad (1)$$

It is noted that the corresponding parameters of Equation (1) are described in detail in REF 3. For example, $P_{CMAX,f,c}$ is a maximum transmission power, $P_{O\_PUCCH,b,f,c}$ is a nominal received power, μ is a sub-carrier spacing (SCS) configuration with μ32 0 corresponding to 15 kHz, $M_{RB,b,f,c}^{PUCCH}$ is a number of RBs for the PUCCH transmission, $PL_{b,f,c}$ is a measured path-loss, $\Delta_{F\_PUCCH}$ depends on several parameters for the PUCCH transmission including a PUCCH format, $\Delta_{TF,b,f,c}$ provides an adjustment according to a spectral efficiency, and $g_{b,f,c}(l)$ is a closed-loop power control (CLPC) state with index l based on transmit power control (TPC) command values the UE receives in DCI formats.

In particular, for a number of UCI bits smaller than or equal to eleven, $\Delta_{TF,b,f,c}$ is described in Equation (2)

$$\Delta_{TF,b,f,c}=10\log_{10}(K_1 \cdot (n_{HARQ-ACK}+O_{SR}+O_{CSI})/N_{RE}) \quad (2)$$

Here $K_1=6$. The expression $n_{HARQ-ACK}$ is a number of HARQ-ACK information bits that the UE determines as described in REF 3 for Type-1 HARQ-ACK codebook or for a Type-2 HARQ-ACK codebook, $O_{SR}$ is a number of SR information bits, and $O_{CSI}$ is a number of CSI information bits.

Equation (3) describes $\Delta_{TF,b,f,c}$ when a number of HARQ-ACK information bits is 1 or 2 and a PUCCH format 0, or a PUCCH format 1 using binary phase shift keying (BPSK) or quaternary phase shift keying (QPSK) modulation is used.

$$\Delta_{TF,b,f,c} = 10\log_{10}\left(\frac{N_{ref}^{PUCCH}}{N_{symb}^{PUCCH}}\right) + \Delta_{UCI} \quad (3)$$

Here $N_{symb}^{PUCCH}$ is a number of PUCCH format 0 symbols or PUCCH format 1 symbols, $N_{ref}^{PUCCH}=2$ for PUCCH format 0, $N_{ref}^{PUCCH}=N_{symb}^{slot}$ for PUCCH format 1, $\Delta_{UCI}=0$ for PUCCH format 0, and $\Delta_{UCI}=10\log_{10}(O_{UCI})$ for PUCCH format 1 where $O_{UCI}$ is a number of UCI bits.

When a number of UCI bits larger than 2 and smaller than 12, Reed-Mueller coding and Equation (2) where $K_1=6$, are used.

In certain embodiments, when a UE provides HARQ-ACK information according to a Type-1 HARQ-ACK codebook over $N_{cells}^{DL}$ DL cells, $n_{HARQ-ACK}$ is described in Equation (4.1), below. Equation (4.2) describes $n_{HARQ-ACK}$ for a Type-1 HARQ-ACK codebook and assuming for simplicity no CBG-based HARQ-ACK information.

$$n_{HARQ-ACK}=\Sigma_{DL=0}^{N_{cells}^{DL}-1}\Sigma_{m=0}^{M_c-1}N_{m,c}^{received}+ \\ \Sigma_{c=0}^{N_{cells}^{DL}-1}\Sigma_{m=0}^{M_c-1}N_{m,c}^{received,CBG} \quad (4.1)$$

$$n_{HARQ-ACK}=\Sigma_{c=0}^{N_{cells}^{DL}-1}\Sigma_{m=0}^{M_c-1}N_{m,c}^{received} \quad (4.2)$$

Here $M_c$ is a total number of occasions for PDSCH receptions or SPS PDSCH release in a set $M_{Ac}$ of occasions for PDSCH receptions or SPS PDSCH release for serving cell c. The expression $N_{m,c}^{received}$ is a number of TBs the UE receives in PDSCH reception occasion m for serving cell c if the UE does not apply HARQ-ACK spatial domain bundling, or a number of PDSCH receptions if the UE applies HARQ-ACK spatial domain bundling, or a SPS PDSCH release in PDSCH reception occasion m for serving cell c. Additionally, the expression $N_{m,c}^{received,CBG}$ is a number of CBGs the UE receives in a PDSCH reception occasion m for serving cell c.

When a UE (such as the UE 116) provides HARQ-ACK information according to a Type-2 HARQ-ACK codebook, $n_{HARQ\text{-}ACK}$ is described in Equation (5), below. The expression $n_{HARQ\text{-}ACK,TB}$ of Equation (5) is described in Equation (6), and the expression $n_{HARQ\text{-}ACK,CBG}$ of Equation (5) is described in Equation (7), below.

$$n_{HARQ\text{-}ACK} = n_{HARQ\text{-}ACK,TB} + n_{HARQ\text{-}ACK,CBG} \quad (5)$$

$$n_{HARQ\text{-}ACK,TB} = \quad (6)$$
$$\left(\left(V_{DAI,m_{last}}^{DL} - \sum_{c=0}^{N_{cells}^{DL}-1} U_{DAI,c}\right) \bmod(T_D)\right) N_{TB,max}^{DL} +$$
$$\sum_{c=0}^{N_{cells}^{DL}-1} \left(\sum_{m=0}^{M-1} N_{m,c}^{received} + N_{SPS,c}\right)$$

$$n_{HARQ\text{-}ACK,CBG} = \quad (7)$$
$$\left(\left(V_{DAI,m_{last}}^{DL} - \sum_{c=0}^{N_{cells}^{DL,CBG}-1} U_{DAI,c}^{CBG}\right) \bmod(T_D)\right) N_{HARQ\text{-}ACK,max}^{CBG/TB,max} +$$
$$\sum_{c=0}^{N_{cells}^{DL}-1} \sum_{m=0}^{M-1} N_{m,c}^{received,CBG}$$

Here, $T_D = 2^{N_{C\text{-}DAI}^{DL}}$ where $N_{C\text{-}DAI}^{DL}$ is a number of bits for a counter DAI field.

As described in Equation (6), if $N_{cells}^{DL} = 1$, then $V_{DAI,m_{last}}^{DL}$ is a value of a counter DAI field in a last DCI format scheduling PDSCH reception or indicating SPS PDSCH release or indicating SCell dormancy, for any serving cell c that the UE detects within the M PDCCH monitoring occasions wherein M is the cardinality of a set of PDCCH monitoring occasions associated with the Type-2 HARQ-ACK codebook. Stated differently, if $N_{cells}^{DL} = 1$, then $V_{DAI,m_{last}}^{DL}$ is the value of the counter DAI in the last DCI format associated with the HARQ-ACK information bits that the UE detects within the M PDCCH monitoring occasions.

As described in Equation (6), if $N_{cells}^{DL} > 1$ and if the UE does not detect any DCI format that includes a total DAI field in a last PDCCH monitoring occasion within the M PDCCH monitoring occasions (M is the cardinality of a set of PDCCH monitoring occasions associated with the Type-2 HARQ-ACK codebook) where the UE detects at least one DCI format scheduling PDSCH reception, indicating SPS PDSCH release or indicating SCell dormancy for any serving cell c, $V_{DAI,m_{last}}^{DL}$ is the value of a counter DAI field in a last DCI format the UE detects in the last PDCCH monitoring occasion. Stated differently, if $N_{cells}^{DL} > 1$ and if the UE does not detect any DCI format that includes a total DAI field in a last PDCCH monitoring occasion within the M PDCCH monitoring occasions where the UE detects at least one DCI format for any serving cell c that is associated with the HARQ-ACK information bits, $V_{DAI,m_{last}}^{DL}$ is the value of the counter DAI in a last DCI format the UE detects in the last PDCCH monitoring occasion.

Alternatively, as described in Equation (6), if $N_{cells}^{DL} > 1$ and if the UE detects at least one DCI format that includes a total DAI field in a last PDCCH monitoring occasion within the M PDCCH monitoring occasions where the UE detects at least one DCI format scheduling PDSCH reception, indicating SPS PDSCH release or indicating SCell dormancy for any serving cell c, $V_{DAI,m_{last}}^{DL}$ is a value of the total DAI field in the at least one DCI format that includes a total DAI field. Stated differently, if $N_{cells}^{DL} > 1$ and if the UE detects at least one DCI format that includes a total DAI field in a last PDCCH monitoring occasion within the M PDCCH monitoring occasions where the UE detects at least one DCI format for any serving cell c that is associated with the HARQ-ACK information bits, $V_{DAI,m_{last}}^{DL}$ is the value of the total DAI in the at least one DCI format that includes a total DAI field.

As described in Equation (6), if $V_{DAI,m_{last}}^{DL} = 0$ and if the UE does not detect any DCI format scheduling PDSCH reception, indicating SPS PDSCH release or indicating SCell dormancy for any serving cell c in any of the M PDCCH monitoring occasions. Stated differently, if $V_{DAI,m_{last}}^{DL} = 0$ and if the UE does not detect any DCI format associated with the HARQ-ACK information bits for any serving cell c in any of the M PDCCH monitoring occasions.

As described in Equation (6), $U_{DAI,c}$ is a total number of DCI formats scheduling PDSCH receptions, indicating SPS PDSCH release or indicating SCell dormancy that the UE detects within the M PDCCH monitoring occasions for serving cell c. $U_{DAI,c} = 0$ if the UE does not detect any DCI format scheduling PDSCH reception, indicating SPS PDSCH release or indicating SCell dormancy for serving cell c in any of the M PDCCH monitoring occasions. Stated differently, $U_{DAI,c}$ is the total number of DCI formats associated with the HARQ-ACK information bits that the UE detects within the M PDCCH monitoring occasions for serving cell c. $U_{DAI,c} = 0$ if the UE does not detect any DCI format associated with the HARQ-ACK information bits for serving cell c in any of the M PDCCH monitoring occasions.

As described in Equation (6), $N_{TB,max}^{DL} = 2$ if a maximum number of TBs that can be provided in a PDSCH reception is 2 for any serving cell c and the UE does not apply HARQ-ACK spatial domain bundling; otherwise, $ND_{TB,max}^{DL} = 1$. Stated differently, $N_{TB,max}^{DL} = 2$ if the UE is configured to receive a maximum of 2 TBs per PDSCH for any serving cell c and spatial domain bundling of HARQ-ACK information bits does not apply; otherwise, $N_{TB,max}^{DL} = 1$.

As described in Equation (6), $N_{m,c}^{received}$ is a number of TBs the UE receives in a PDSCH scheduled by a DCI format that the UE detects in PDCCH monitoring occasion m for serving cell c if the UE does not apply HARQ-ACK spatial domain bundling, or a number of PDSCHs scheduled by a DCI format that the UE detects in PDCCH monitoring occasion m for serving cell c if the UE applies HARQ-ACK spatial domain bundling, or a number of DCI formats that the UE detects and indicate SPS PDSCH release in PDCCH monitoring occasion m for serving cell c, or a number of DCI formats that the UE detects and indicate SCell dormancy in PDCCH monitoring occasion m for serving cell c. Stated differently, $N_{m,c}^{received}$ is the number of TBs the UE receives in a PDSCH scheduled by a DCI format that the UE detects in PDCCH monitoring occasion m for serving cell c when there is no spatial bundling of HARQ-ACK information, or the number of PDSCH scheduled by a DCI format that the UE detects in PDCCH monitoring occasion m for serving cell c when there is spatial bundling of HARQ-ACK information, or the number of DCI formats that the UE detects in PDCCH monitoring occasion m for serving cell c that do not schedule PDSCH reception and are associated with HARQ-ACK information.

As described in Equation (6), $N_{SPS,c}$ is the number of SPS PDSCH receptions by the UE on serving cell c for which the UE transmits corresponding HARQ-ACK information in the same PUCCH as for HARQ-ACK information corresponding to PDSCH receptions within the M PDCCH monitoring occasions.

The components of Equation (7) are similar as for $n_{HARQ\text{-}ACK,TB}$ of Equation (6), and a corresponding description is provided in REF 3.

In certain embodiments, a UE (such as the UE 116) monitors multiple candidate locations for respective potential PDCCH receptions to decode multiple DCI formats in a slot, according to respective search space sets. A DCI format includes cyclic redundancy check (CRC) bits in order for the UE to confirm a correct detection of the DCI format. A DCI format type is identified by a radio network temporary identifier (RNTI) that scrambles the CRC bits.

For a DCI format scheduling a PDSCH or a PUSCH to a single UE (such as the UE 116), the RNTI can be (i) a cell RNTI (C-RNTI), (ii) a configured scheduling RNTI (CS-RNTI), or (iii) a modulation and coding scheme (MCS)-C-RNTI and serves as a UE identifier. In the following, for brevity, only the C-RNTI is often referred to. A UE can receive/monitor PDCCH for detections of DCI formats with CRC scrambled by a C-RNTI according to a UE-specific search space (USS). For DCI format 0_0 and DCI format 1_0 that schedule PUSCH transmissions and PDSCH receptions, respectively, to a UE, the UE can additionally be configured to monitor corresponding PDCCH according to common search space (CSS).

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to a corresponding CSS set on a primary cell. There are also a number of other RNTIs provided to a UE by UE-specific RRC signaling and are associated with DCI formats providing various control information and have corresponding PDCCHs that a UE monitors according to a Type-3 CSS set on the primary cell or on a secondary cell. Such DCI formats include a DCI format 2_0 providing a structure of a slot in term of DL, UL or flexible/reserved symbols over a number of slots, a DCI format 2_2 providing TPC commands for PUSCH or PUCCH transmissions, a DCI format 2_3 providing TPC commands for SRS transmissions and also potentially triggering a SRS transmission on a number of cells, and so on, and a corresponding CSS is referred to as Type-3-PDCCH CSS.

When a PDSCH reception is by a single UE it is referred to as unicast PDSCH reception. Alternatively, when a PDSCH reception is by a group of UEs it is referred to as multicast (or groupcast) PDSCH reception. The terms "multicast" and "groupcast" are interchangeably used in the present disclosure. The determination can be based on a RNTI used to scramble a CRC of a DCI format scheduling the PDSCH reception or activating SPS PDSCH receptions, or based on a RNTI used to scramble a CRC of a transport block provided by a PDSCH reception. For unicast PDSCH receptions, the RNTI can be a C-RNTI, a CS-RNTI or an MCS-C-RNTI. For multicast PDSCH receptions, the RNTI can be one or more G-RNTIs or a G-CS-RNTIs. HARQ-ACK information in response to unicast PDSCH receptions or in response to unicast DCI formats with CRC scrambled by C-RNTI, CS-RNTI, or MCS-C-RNTI is referred to as unicast HARQ-ACK information and, together with SR or CSI, can be referred to as unicast UCI. HARQ-ACK information in response to multicast PDSCH receptions or in response to multicast DCI formats with CRC scrambled by G-RNTI, G-CS-RNTI is referred to as multicast HARQ-ACK information.

A UE can be configured to receive both unicast PDSCH and multicast PDSCH. The UE can identify whether a PDSCH reception is a unicast one or a multicast on based on the DCI format scheduling the PDSCH reception, or based on a configuration by higher layers when the PDSCH reception is not scheduled by a DCI format. For example, a DCI format with CRC scrambled by a first RNTI, such as a C-RNTI, or having a field indicating a first PDSCH type, such as unicast PDSCH, can be used to schedule a unicast PDSCH reception while a DCI format with CRC scrambled by a second RNTI, such as a G-RNTI, or having a field indicating a second PDSCH type, such as multicast PDSCH, can be used to schedule a multicast PDSCH reception.

For example, a DCI format can include a service-type indicator field wherein a first value can indicate scheduling of a unicast PDSCH reception, and a second value can indicate scheduling of a multicast PDSCH reception. For example, a first DCI format scheduling of unicast PDSCH reception can have a first size and a second value can indicate scheduling of a multicast PDSCH reception.

A DCI format scheduling a multicast PDSCH reception uses a G-RNTI can have for example a same size as a DCI format 1_0 or, in general, as a DCI format with CRC scrambled by a C-RNTI, or as a DCI format 2_x, where for example x=0, . . . 6, as they are described in REF 2.

More than one DCI formats with respective same or different sizes can be used to schedule multicast PDSCH receptions or activation/deactivation of multicast SPS PDSCH receptions. Multicast PDCCH or PDSCH receptions by a UE are within a common frequency region (CFR) that is included in an active DL BWP of the UE. The following descriptions consider the active DL BWP and the active UL BWP for unicast signaling, and the CFR for multicast signaling.

A UE (such as the UE 116) can support a predetermined number of HARQ processes, such as sixteen HARQ processes. The number of supported HARQ processes can be a requirement or a capability that the UE reports to a serving gNB (such as BS 102). When a UE is configured to receive both unicast PDSCH and multicast PDSCH, a HARQ process for a corresponding TB can be associated either with a unicast PDSCH or with a multicast PDSCH for a corresponding Type-2 HARQ-ACK codebook. When an initial reception of a TB is provided by a multicast PDSCH reception by a UE, a subsequent reception of the TB can be provided either by a multicast PDSCH reception or by a unicast PDSCH reception by the UE, for example when the UE reports a NACK value for the initial reception of the TB, and the UE can multiplex HARQ-ACK information for the subsequent reception of the TB in a HARQ-ACK codebook for multicast PDSCH receptions or in a HARQ-ACK codebook for unicast PDSCH receptions, respectively. A gNB (such as BS 102) can enable or disable a HARQ-ACK information report from a UE based on an indication by higher layers or based on an indication in a DCI format scheduling a corresponding PDSCH reception when the HARQ-ACK information report from the UE is enabled based on the indication by higher layers. The gNB can additionally disable a HARQ-ACK information report for a set of HARQ processes that the gNB can provide to the UE by higher layers.

A UE can be provided by higher layer a first information element (IE) PUCCH-Config providing parameters for a PUCCH transmission with unicast UCI, such as HARQ-ACK information associated with a DCI format with CRC scrambled by a C-RNTI, SR, or CSI, and a second IE PUCCH-Config providing parameters for a PUCCH transmission with HARQ-ACK information (and possibly CSI) associated with a DCI format with CRC scrambled by a G-RNTI. In certain embodiments, when the second IE PUCCH-Config is not provided, PUCCH resources associated with multicast HARQ-ACK information can also be provided by the first IE PUCCH-Config.

In certain embodiments, when a UE (such as the UE 116) receives both unicast PDSCH and multicast PDSCH, the UE needs to determine how to provide corresponding HARQ-ACK information. A first option is for the UE to determine separate HARQ-ACK codebooks for unicast PDSCH receptions and for multicast PDSCH receptions. The UE can then multiplex each of the HARQ-ACK codebooks in a separate corresponding PUCCH transmission or the UE can jointly or separately encode and multiplex the HARQ-ACK codebooks in a same PUCCH transmission. A second option is for the UE to determine a single HARQ-ACK codebook for unicast and for multicast PDSCH receptions. The second option is not generally possible for a Type-2 HARQ-ACK codebook as, unlike a value of a first DAI field in a DCI format scheduling a unicast PDSCH reception, a value of a second DAI field in a DCI format scheduling a multicast PDSCH reception cannot be specific to a UE and therefore the UE cannot determine a Type-2 HARQ-ACK codebook by jointly processing the values of the first and second DAI fields. For a Type-1 HARQ-ACK codebook, determining a single HARQ-ACK codebook for unicast PDSCH receptions and for multicast PDSCH receptions is possible.

A TPC command in the DCI format scheduling a PUCCH transmission with multicast HARQ-ACK information can be omitted because it would not provide meaningful functionality as it cannot differentiate among UEs while the PUCCH transmission is UE-specific. Further, when unicast HARQ-ACK information and multicast HARQ-ACK information are multiplexed in a same PUCCH, a transmission power for the PUCCH needs to be determined considering both the unicast and the multicast HARQ-ACK information.

A UE can be provided separate information for a HARQ-ACK codebook type that the UE generates for unicast HARQ-ACK information and for a HARQ-ACK codebook type that the UE generates for multicast HARQ-ACK information. For example, the UE can be indicated to generate a Type-1 HARQ-ACK codebook for unicast HARQ-ACK information and a Type-2 HARQ-ACK codebook for multicast HARQ-ACK information, or the reverse, or to generate a same HARQ-ACK codebook type for both unicast and multicast HARQ-ACK information. Unless the UE is indicated to generate a Type-1 HARQ-ACK codebook for both unicast and multicast HARQ-ACK information, the UE generates each HARQ-ACK codebook separately for unicast and multicast HARQ-ACK information; otherwise, the UE can generate a joint Type-1 HARQ-ACK codebook for unicast and multicast HARQ-ACK information. When the UE generates separate HARQ-ACK codebooks for unicast and multicast HARQ-ACK information, the UE can append the multicast HARQ-ACK codebook to the unicast HARQ-ACK codebook and jointly code the combined HARQ-ACK information bits of same priority value. The UE can also be configured multiple G-RNTIs and to generate a same or different HARQ-ACK codebook type for each G-RNTI. When the HARQ-ACK codebook type is same for all G-RNTIs, for example based on the specifications of the system operation, the UE can separately generate a Type-2 HARQ-ACK codebook for each G-RNTI or jointly generate a Type-1 HARQ-ACK codebook for all G-RNTIs, for example by considering the union of sets of slot timing values $K_1$ and the union of row indexes of time domain resource allocation (TDRA) tables for DCI formats the UE is configured to monitor PDCCH for serving cell c for corresponding G-RNTIs, for example similar to the descriptions in REF 3 in case of multiple unicast DCI formats, if there is more than one set of slot timing value, or more than one set of row indexes of a TDRA table, for the G-RNTIs.

A PUCCH transmission from a UE (such as the UE 116) can be with a number of repetitions. The number of repetitions can be provided to the UE by higher layers or, when the PUCCH transmission includes HARQ-ACK information, it can be indicated to the UE by a field in a DCI format associated with the HARQ-ACK information. The field can be a separate field indicating the number of repetitions or can be another field, such as a PUCCH resource indication field, wherein a PUCCH resource also includes a number of repetitions. For a PUCCH transmission providing HARQ-ACK information for groupcast PDSCH receptions, an indication for the number of repetitions by the DCI formats scheduling the PDSCH receptions is not possible as the DCI formats can be received by more than one UEs and not all of the more than one UEs may need to transmit a PUCCH with repetitions.

A PUCCH resource indicator in a DCI format scheduling a groupcast PDSCH reception for reporting HARQ-ACK associated with the groupcast PDSCH reception is not necessary as it is constrained to indicate a PUCCH resource to multiple UEs and there is no material benefit for indicating to all such UEs to use, for example, the second or the seventh PUCCH resource in a PUCCH resource set. Absence of the PUCCH resource indicator in the DCI format offers some overhead reduction but another mechanism needs to be defined for a UE to determine a PUCCH resource for a PUCCH transmission with groupcast/multicast HARQ-ACK information.

Therefore, embodiments of the present disclosure take into consideration that there is a need to determine a power for a PUCCH transmission with groupcast HARQ-ACK information depending on whether or not other UCI is also multiplexed in the PUCCH transmission.

Embodiments of the present disclosure also take into consideration that there is a need to determine a power for a PUCCH transmission with groupcast HARQ-ACK information depending on a number of groupcast HARQ-ACK information bits and a number of unicast HARQ-ACK information bits.

Embodiments of the present disclosure further take into consideration that there is a need to enable repetitions for a first PUCCH transmission with HARQ-ACK information in response to PDSCH receptions scheduled by a multicast DCI format with CRC scrambled by a G-RNTI and in response to PDSCH receptions scheduled by a unicast DCI format with CRC scrambled by a C-RNTI.

Accordingly, embodiments of the present disclosure, such as those described below relate to determining a power for a PUCCH transmission with groupcast HARQ-ACK information depending on whether or not other UCI is also multiplexed in the PUCCH transmission. In particular, FIGS. 8 and 10 relate to determining a power for a PUCCH transmission with groupcast HARQ-ACK information depending on a number of groupcast HARQ-ACK information bits and a number of unicast HARQ-ACK information bits. Additionally, FIGS. 14 and 15 relate to enabling repetitions for a first PUCCH transmission with HARQ-ACK information in response to PDSCH receptions scheduled by multicast DCI formats and in response to PDSCH receptions scheduled by unicast DCI formats.

Additionally, HARQ-ACK information reports from a UE can be enabled or disabled by higher layer signaling or by a DCI format scheduling an associated PDSCH reception or activating/deactivating SPS PDSCH receptions. The indication for disabling a HARQ-ACK information report can also be per RNTI, including per G-RNTI in case of multiple G-RNTI(s), or per SPS PDSCH configuration. Therefore, a determination of a PUCCH transmission power should exclude TB s or SPS PDSCH receptions that are associated with disabled HARQ-ACK information reports.

When a UE multiplexes HARQ-ACK information in a PUSCH that is scheduled by a DCI format, the UE uses a downlink assignment index (DAI) field that is included in the DCI format to determine a Type-2 HARQ-ACK information codebook. For multicast HARQ-ACK information, the DCI format would need to include a DAI field for each Type-2 HARQ-ACK codebook for each respective G-RNTI that is configured to the UE, in addition to the DAI field for a HARQ-ACK codebook for a C-RNTI (unicast HARQ-ACK codebook). Adding a DAI field for each G-RNTI would result to a corresponding increase in the DCI format size. In some cases, when a DCI format 0_1 or DCI format 0_2 is smaller in size that a DCI format 1_1 or a DCI format 1_2 and size matching may then apply by adding padding bits, as described in REF 2, and including additional DAI fields in the DCI format 0_1 or DCI format 0_2 for respective G-RNTIs is meaningful as the bits of those DAI fields would replace padding bits. In other cases, such as for DCI format 1_0 that has a fixed size, it is not possible to add new fields and a different mechanism is needed to determine a HARQ-ACK codebook for s respective G-RNTI.

When HARQ-ACK information is multiplexed in a PUSCH, a number of reserved REs can be included in the PUSCH, as described in REF 2. The number of reserved REs can be included in the PUSCH in order to avoid errors in mapping data information when a gNB (such as BS 102) expects the UE to multiplex HARQ-ACK information in the PUSCH but the UE failed to detect associated DCI formats. When a UE is configured to monitor PDCCH for detection of DCI formats associated with one or more G-RNTI, in addition to DCI formats scheduling PDSCH receptions or SPS PDSCH activation/release, a same protection against missed detection of DCI formats needs to be provided for each G-RNTI.

In order to avoid a substantial increase in PUCCH overhead that would result when many or all UEs receiving a multicast PDSCH provide corresponding HARQ-ACK information in respective PUCCHs, a serving gNB (such as BS 102) can configure at least some UEs to transmit corresponding PUCCHs only when the UEs incorrectly receive at least one TB in a corresponding multicast PDSCH. Such UEs can share a PUCCH resource and the serving gNB can perform energy detection to determine a PUCCH transmission and therefore determine incorrect reception of one or more TBs associated with the PUCCH resource. A PUCCH format 0, or a PUCCH format 1 where all symbols are unmodulated (or, equivalently, use BPSK modulation with a numeric bit value of 1), as described in REF 3, can be used for the PUCCH transmission and for the serving gNB to perform energy detection.

For example, for a maximum of M TB receptions (a reception of 2 TBs is considered a single TB reception for the purposes of HARQ-ACK reporting when HARQ-ACK spatial bundling applies), a number of possible combinations for one or more corresponding NACK values is $$\sum_{k=1}^{M} \binom{M}{k}, \text{ where } \binom{M}{k} = \frac{M!}{k!(M-k)!}.$$

The UE can be configured a set of $$\sum_{k=1}^{M} \binom{M}{k}$$

PUCCH resources and select a resource from the set of resources for a PUCCH transmission according to a combination of corresponding TBs associated with NACK values (and with ACK values). For example, for a maximum of M=4 TB s for a UE to provide HARQ-ACK information when there is at least one incorrect TB reception, the UE can be provided a set of 15 PUCCH resources and the UE can select a PUCCH resource according to one of the 15 combinations for TBs with NACK values or ACK values. For example, the UE can select the first PUCCH resource to indicate incorrect reception for only the first TB, the second resource to indicate incorrect reception for only the second TB, and so on, select the fifth resource to indicate incorrect reception of the first and second TBs, and so on, and select the fifteenth resource to indicate incorrect reception of all 4 TBs. A PUCCH transmission power when values of HARQ-ACK information are provided via PUCCH resource selection, instead of the PUCCH resource being independent of HARQ-ACK information values, needs to be determined.

A reliability for UCI provided by a PUCCH also depends on an ability of a UE to transmit the PUCCH with a required power for the reliability. A serving gNB typically obtains information for that ability based on a power headroom report (PHR) the UE provided when the UE becomes power limited for a transmission. However, a UE may provide a PHR only for PUSCH transmissions and not for PUCCH transmissions and it is not generally possible for a gNB to determine a PHR for a PUCCH from a PHR for a PUSCH because a CLPC adjustment state can be different for the PUCCH and for the PUSCH as corresponding TPC commands are separate. One solution is for a UE to provide a PHR for a PUCCH transmission, separately from a PHR for a PUSCH transmission. Another solution that can be more beneficial is to define a common CLPC adjustment state for PUCCH and for PUSCH transmissions. A CLPC adjustment state also needs to be defined for a PUCCH transmission with multicast HARQ-ACK information.

Therefore, embodiments of the present disclosure take into consideration that there is a need to determine a power for a PUCCH transmission that includes one or more multicast HARQ-ACK codebooks and may also include a unicast HARQ-ACK codebook.

Embodiments of the present disclosure also take into consideration that there is a need to determine a power for a PUCCH transmission when HARQ-ACK information reports in response to reception of one or more TB s are disabled based on higher layer signaling or based on an indication by DCI formats scheduling respective PDSCH receptions.

Embodiments of the present disclosure further take into consideration that there is a need to determine a PHR and a closed loop power control adjustment state for a PUCCH transmission with unicast UCI or with multicast HARQ-ACK information.

Additionally, embodiments of the present disclosure take into consideration that there is a need to enable multiplexing of multiple HARQ-ACK codebooks in a PUSCH while reducing a probability for incorrect multiplexing of data information.

Accordingly, embodiments of the present disclosure, such as those described in below relate to determining a power for a PUCCH transmission that includes one or more multicast HARQ-ACK codebooks and may also include a unicast HARQ-ACK codebook. The disclosure also relates to determining a power for a PUCCH transmission when HARQ-ACK information reports in response to reception of one or more TB s are disabled based on higher layer signaling or based on an indication by DCI formats scheduling respective PDSCH receptions. The disclosure further relates to determining a PHR and a CLPC adjustment state for a PUCCH transmission with unicast UCI or with multicast HARQ-ACK information. Additionally, the disclosure relates to enabling multiplexing of multiple HARQ-ACK codebooks in a PUSCH while reducing a probability for incorrect multiplexing of data information.

HARQ-ACK information can be for PDSCH receptions scheduled by DCI formats, or for SPS PDSCH receptions, or for a SPS PDSCH release, or for detection of a DCI format that does not schedule a PDSCH reception or a PUSCH transmission and instead provides an indication, such as for dormant/non-dormant active DL BWPs for the UE in a group of cells, or any other indication without scheduling a PDSCH reception.

In the following, HARQ-ACK codebooks are considered for multicast HARQ-ACK information associated with one or more G-RNTIs, or for unicast HARQ-ACK information, but the embodiments are applicable to any type of HARQ-ACK information associated with separate generation of corresponding HARQ-ACK codebooks.

Embodiments of the present disclosure describe transmission power determination for a PUCCH with groupcast HARQ-ACK information. This is described in the following examples and embodiments, such as those of FIGS. 8-13. That is, embodiments of the disclosure consider a procedure for determining a transmission power for a PUCCH with groupcast HARQ-ACK information that are associated with PDSCH receptions scheduled by DCI formats with CRC scrambled by first RNTIs such as G-RNTIs. Additionally, embodiments of the present disclosure describe power determination for a PUCCH transmission triggered due to incorrect TB receptions. This is also described in the following examples and embodiments, such as those of FIGS. 8-13. That s, embodiments of the disclosure consider a determination by a UE (such as the UE 116) of a power for a PUCCH transmission that includes a first HARQ-ACK codebook and one or more second HARQ-ACK codebooks. The exemplary embodiment considers that the first HARQ-ACK codebook includes unicast HARQ-ACK information (unicast HARQ-ACK codebook) and the one or more second HARQ-ACK codebooks include multicast HARQ-ACK information (multicast. HARQ-ACK codebooks). The one or More multicast. HARQ-ACK codebooks are associated with respective one or ore G-RNTIs. The HARQ-ACK information bits of the first HARQ-ACK codebook and of the one or more second HARQ-ACK codebooks have a same priority and are jointly encoded.

Figure 8:
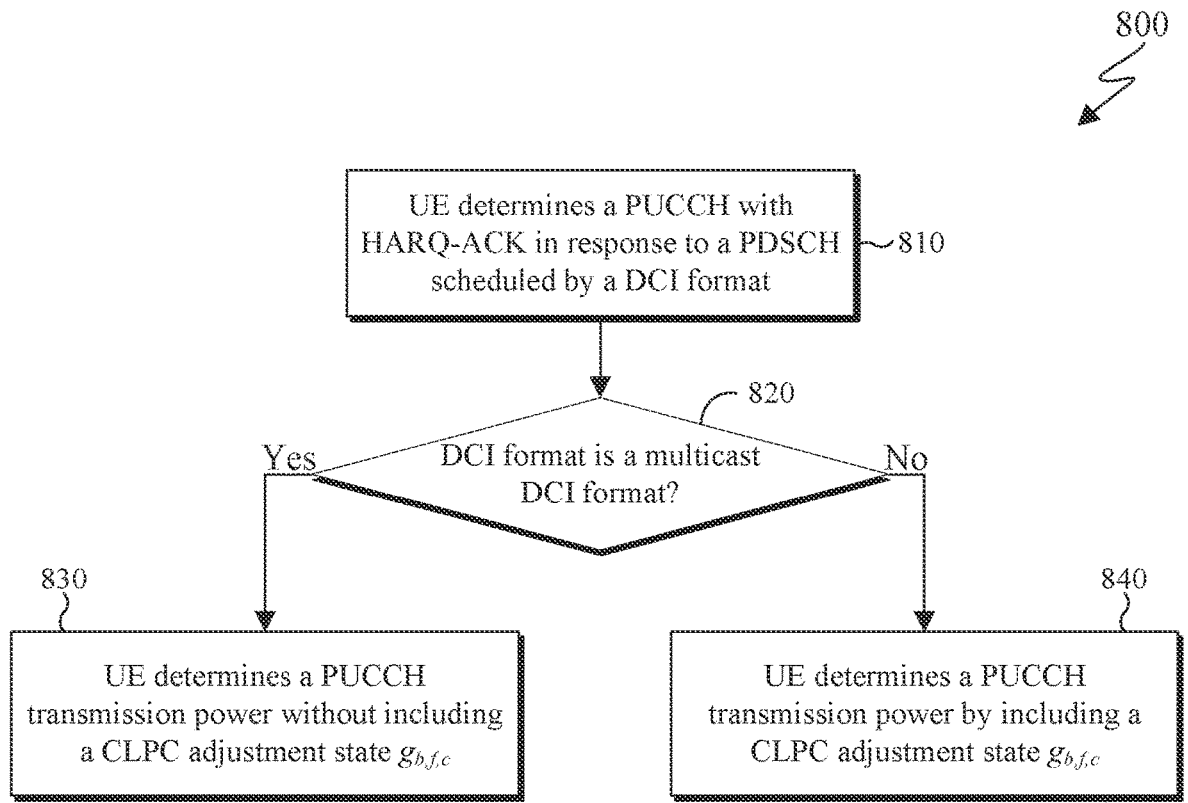
FIG. 8 illustrates a method for a UE to determine a PUCCH transmission power according to embodiments of the present disclosure.
Figure 9:
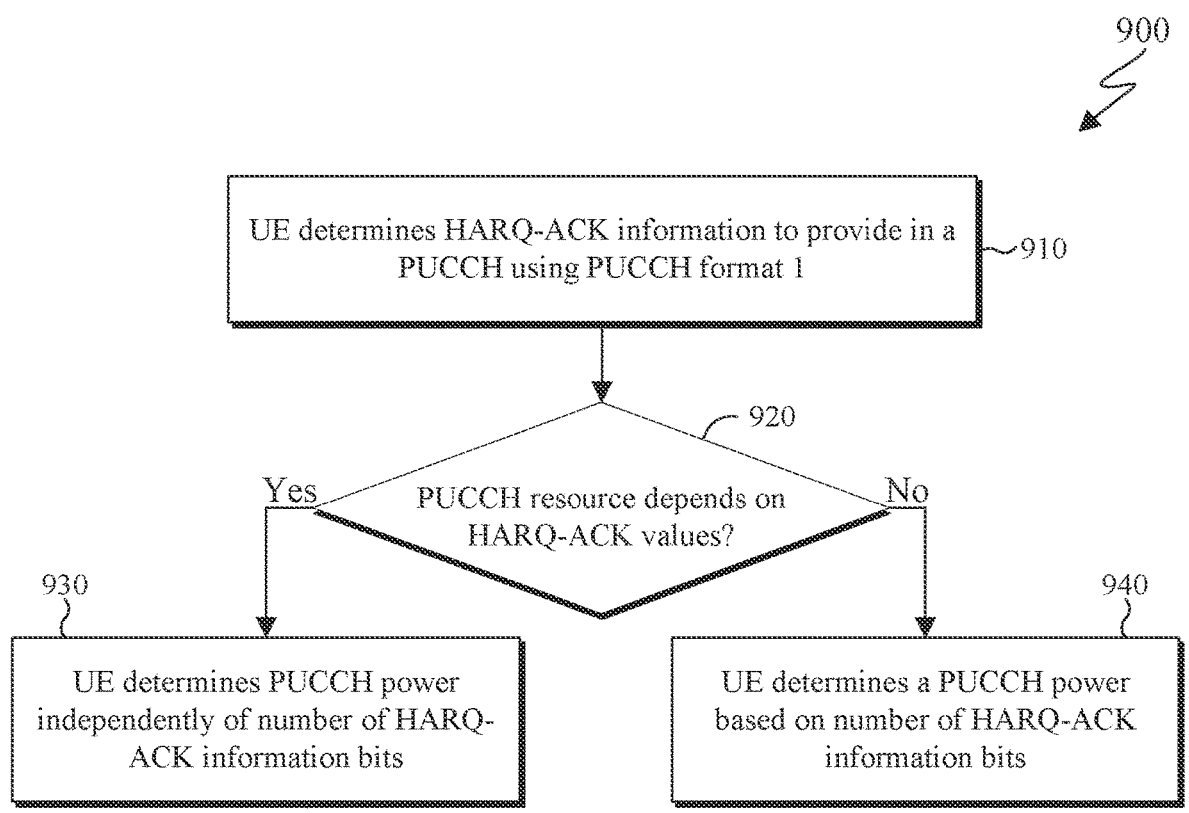
FIG. 9 illustrates a method for a UE to determine a power for a PUCCH transmission with hybrid automatic repeat request acknowledgement (HARQ-ACK) information according to embodiments of the present disclosure.
Figure 10:
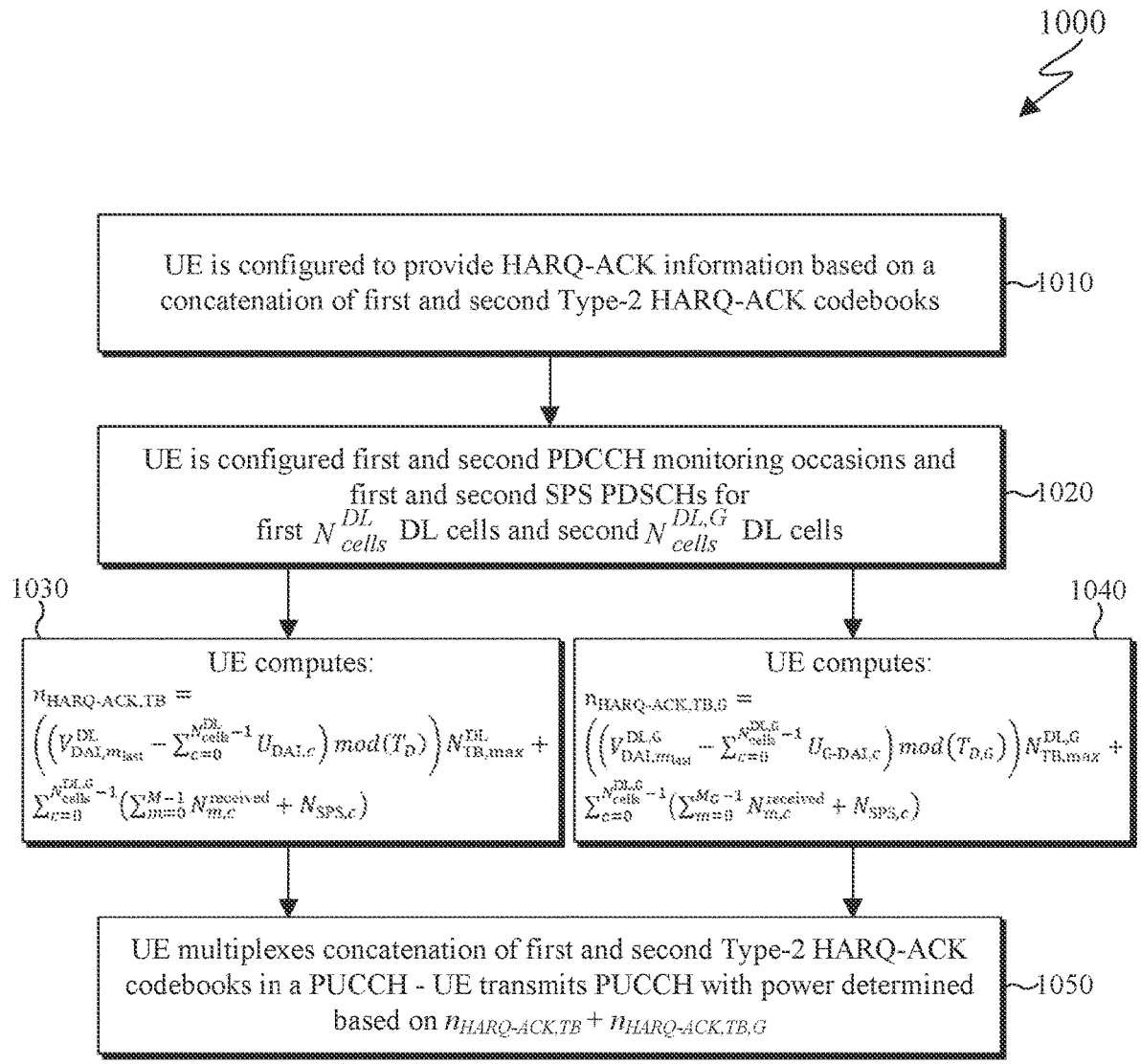
FIG. 10 illustrates a method for a UE to determine a PUCCH transmission power according to embodiments of the present disclosure.
Figure 11:
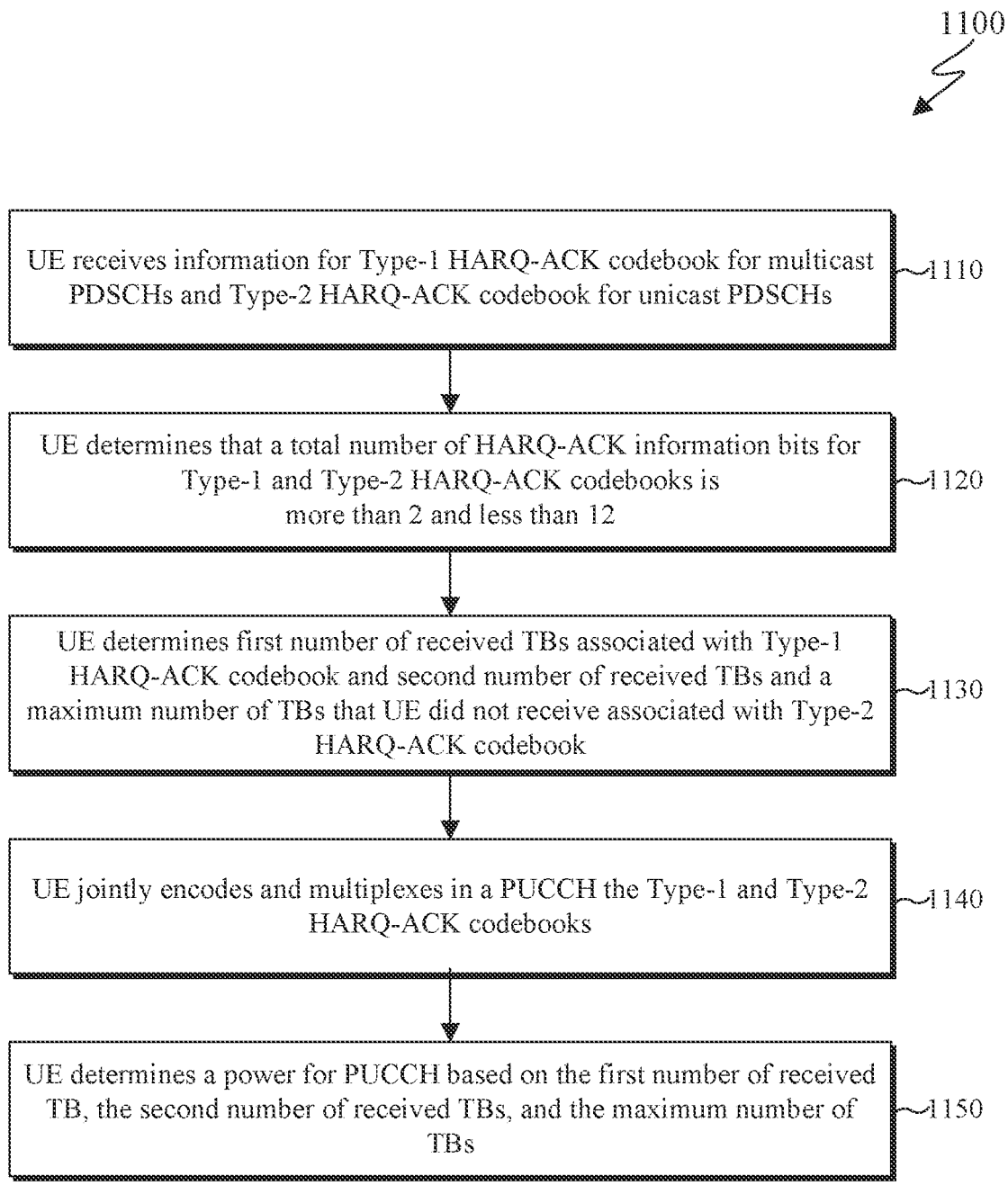
FIG. 11 illustrates a method for a UE to determine a power for a PUCCH transmission that includes jointly encoded first Type-1 HARQ-ACK codebook and second Type-2 HARQ-ACK codebook according to embodiments of the present disclosure.
Figure 12:
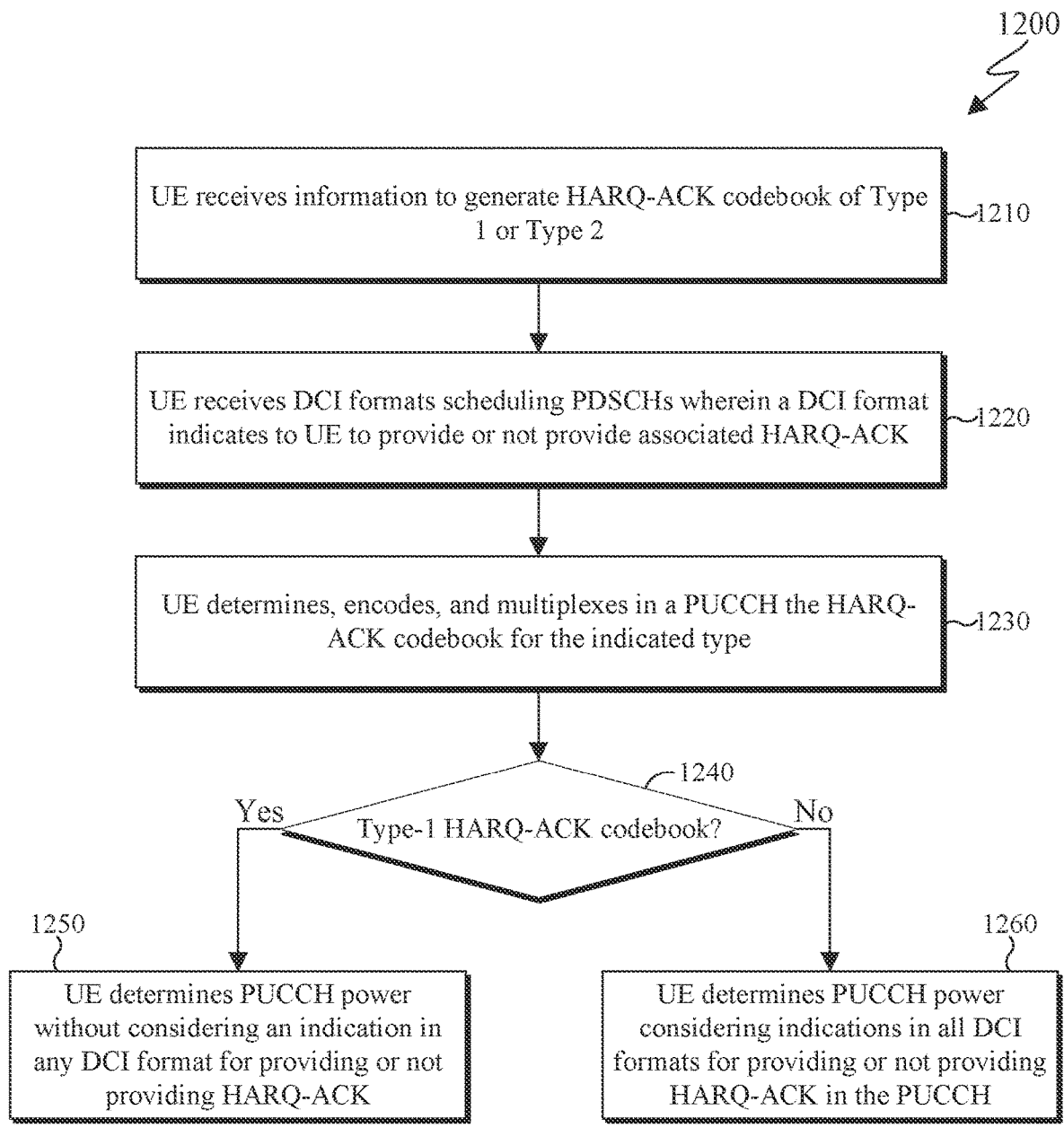
FIG. 12 illustrates a method for a UE to determine a power for a PUCCH transmission according to embodiments of the present disclosure.
Figure 13:
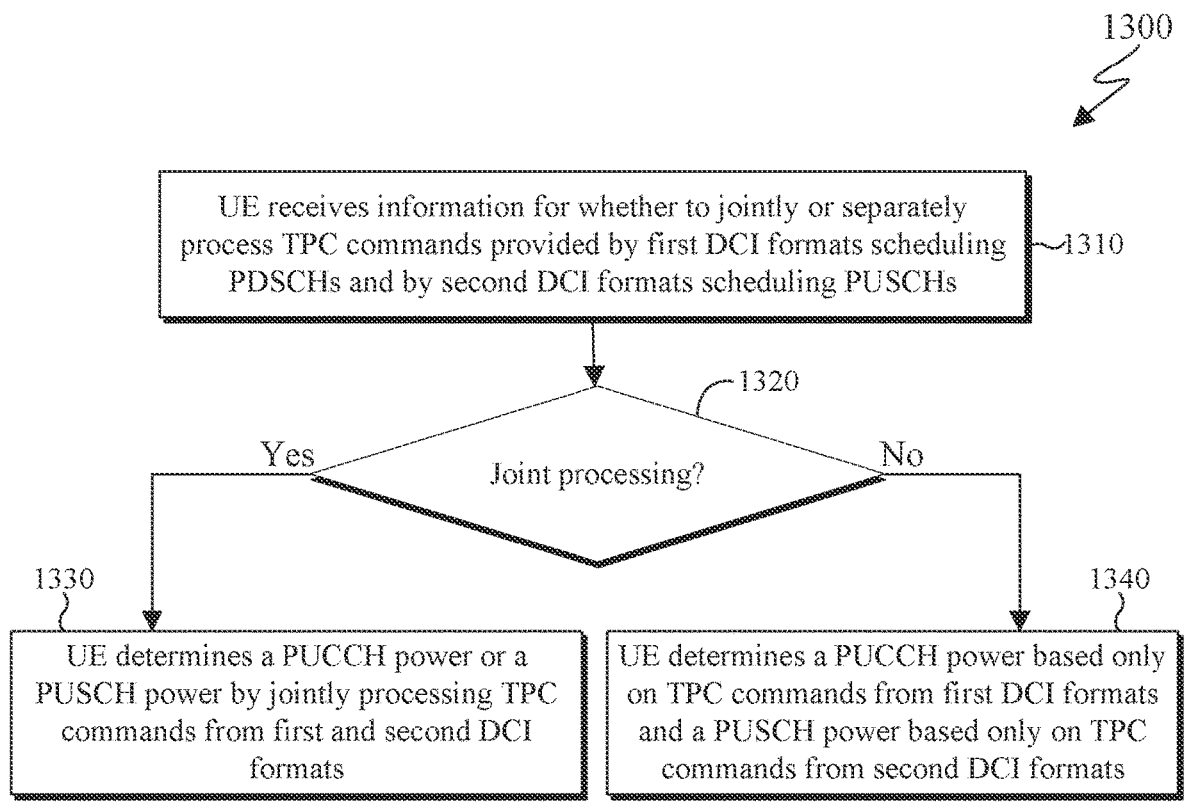
FIG. 13 illustrates a method for a UE to determine a power for a PUCCH transmission based on transmission power control protocol (TPC) commands received in downlink control information (DCI) formats scheduling physical downlink shared channel (PDSCH) receptions or physical uplink shared channel (PUSCH) transmissions according to embodiments of the present disclosure.

FIG. 8 illustrates a method 800 for a UE to determine a PUCCH transmission power according to embodiments of the present disclosure. FIG. 9 illustrates a method 900 for a UE to determine a power for a PUCCH transmission with HARQ-ACK information according to embodiments of the present disclosure. FIG. 10 illustrates a method 1000 for a UE to determine a PUCCH transmission power according to embodiments of the present disclosure. FIG. 11 illustrates a method 1100 for a UE to determine a power for a PUCCH transmission that includes jointly encoded first Type-1 HARQ-ACK codebook and second Type-2 HARQ-ACK codebook of same priorities according to embodiments of the present disclosure. FIG. 12 illustrates a method 1200 for a UE to determine a power for a PUCCH transmission according to embodiments of the present disclosure. FIG. 13 illustrates a method 1300 for a UE to determine a power for a PUCCH transmission based on transmission power control (TPC) commands received in DCI formats scheduling PDSCH receptions or PUSCH transmissions according to embodiments of the present disclosure.

The steps of the method 800 of FIG. 8, the method 900 of FIG. 9, the method 1000 of FIG. 10, the method 1100 of FIG. 11, the method 1200 of FIG. 12, and the method 1300 of FIG. 13 can be performed by any of the UEs 111-119 of FIG. 1, such as the UE 116 of FIG. 3. The methods 800-1300 are for illustration only and other embodiments can be used without departing from the scope of the present disclosure.

In certain embodiments, when a UE transmits a PUCCH that includes only HARQ-ACK information for groupcast PDSCH receptions, the UE is configured whether or not to apply a CLPC adjustment state $g_{b,f,c}$ for the determination of a PUCCH transmission power. One reason is that a DCI format scheduling groupcast PDSCH receptions may not include a TPC command field. Although a TPC command can be provided to a UE through a DCI format 2_2 with CRC scrambled by a TPC-PUCCH-RNTI, frequent transmission of a PDCCH with a DCI format 2_2 can be difficult for a network to support. Further, as a search space set associated with PDCCH transmissions providing DCI format 2_2 has a periodicity, TPC commands provided by DCI format 2_2 are more appropriate for periodic transmissions, such as for SR, CSI or configured-grant PUSCH, while a TPC command that is periodically provided for a non-periodic transmission may be outdated and not reflect a current state of a channel medium. Another reason is that a UE receiving groupcast PDSCH receptions may not have recent unicast traffic (data buffer for the UE is empty at the gNB and at the UE) and then the gNB may not have information for a power of receptions from the UE in order to set the TPC command. For UEs with relatively frequent transmissions, a CLPC adjustment state $g_{b,f,c}$ can be current and such UEs can be configured to apply the CLPC adjustment state $g_{b,f,c}$ for determining a power of a PUCCH transmission with HARQ-ACK information associated with a multicast DCI format.

The method 800 of FIG. 8 illustrates an example procedure for a UE to determine a PUCCH transmission power according to embodiments of this disclosure.

In step 810, a UE (such as the UE 116) determines a PUCCH transmission with HARQ-ACK information in response to a PDSCH reception scheduled by a DCI format. In step 820, the UE determines whether or not the DCI format is a multicast DCI format. When the DCI format is a multicast DCI format (as determined in step 820), the UE in step 830 determines a PUCCH transmission power without including a CLPC adjustment state $g_{b,f,c}$. That can additionally be based on a configuration that the UE receives by higher layers and instructing the UE to not use the CLPC adjustment state $g_{b,f,c}$ in determining a transmission power for a PUCCH with HARQ-ACK information associated with the first DCI format. Alternatively, when the DCI format is not a multicast DCI format (as determined in step 820), the UE in step 840 determines a PUCCH transmission power by including a CLPC adjustment state $g_{b,f,c}$.

In certain embodiments, when HARQ-ACK information associated with multicast DCI formats is multiplexed in a same PUCCH as HARQ-ACK information associated with unicast DCI formats, the PUCCH transmission follows a PUCCH-Config associated with the unicast DCI formats and the UE determines a PUCCH transmission power by including a CLPC adjustment state $g_{b,f,c}$.

When a UE transmits a PUCCH that includes multicast HARQ-ACK information and does not include unicast HARQ-ACK information (or, in general, unicast UCI), the determination of the power $P_{PUCCH,b,f,c}$ in Equation (1), above, can be adjusted to not include a CLPC component $g_{b,f,c}$ as it is not generally possible for a DCI format scheduling multicast PDSCH receptions to a group of UEs to include a TPC command for each UE in the group of UEs. Alternatively, the UE uses a $g_{b,f,c}$ value from a last PUCCH transmission occasion i that includes unicast UCI. In case the UE is provided two CLPC adjustment states 1 for a PUCCH transmission, $g_{b,f,c}$ can correspond to the value of a last PUCCH transmission occasion i that includes unicast UCI (such as HARQ-ACK) and uses the first state l=0, or can correspond to the value of a last PUCCH transmission occasion i that includes unicast UCI (such as HARQ-ACK) and uses state l, wherein l is either l=0 or l=1, or the state l can be informed to the UE from a serving gNB by higher layer signaling. Also, the value of $P_{O\_PUCCH,b,f,c}$ can be separately configured as $P_{O\_PUCCH,b,f,c}^M$ when the UE transmits a PUCCH with only multicast HARQ-ACK information. Then, when $g_{b,f,c}$ is not included, the UE determines a corresponding power $P_{PUCCH,b,f,c}^M$ is described in Equation (8) while when $g_{b,f,c}$ is included in the determination of $P_{PUCCH,b,f,c}^M$ and corresponds, for example, to the value l=0 of the first state for a last PUCCH transmission occasion with unicast UCI using l=0, the UE determines $P_{PUCCH,b,f,c}^M$ as described in Equation (9).

$$P_{PUCCH,b,f,c}^M = \min\left\{\begin{array}{l}P_{CMAX,f,c}\\P_{O_{PUCCH,b,f,c}}^M + 10\log_{10}(2^\mu \cdot M_{RB,b,f,c}^{PUCCH}) + \\ PL_{b,f,c} + \Delta_{F\_PUCCH} + \Delta_{TF,b,f,c}\end{array}\right\}[dBm] \quad (8)$$

$$P_{PUCCH,b,f,c}^M = \min\left\{\begin{array}{l}P_{CMAX,f,c}\\P_{O_{PUCCH,b,f,c}}^M + 10\log_{10}(2^\mu \cdot M_{RB,b,f,c}^{PUCCH}) + \\ PL_{b,f,c} + \Delta_{F\_PUCCH} + \Delta_{TF,b,f,c} + g_{b,f,c}(l=0)\end{array}\right\}[dBm] \quad (9)$$

When a UE transmits a PUCCH using PUCCH format 1 that indicates HARQ-ACK information values for respective receptions of TBs or of DCI formats in a corresponding HARQ-ACK codebook that is provided by a PDCCH transmission in a PUCCH resource that does not depend on the HARQ-ACK information values, a value of $\Delta_{TF,b,f,c}(i)$ for transmission occasion i is as described in REF 3 and in Equation (10), below.

$$\Delta_{TF,b,f,c}(i)=10\ \log_{10}(N_{ref}^{PUCCH}/N_{symb}^{PUCCH}(i))+\Delta_{UCI}(i) \quad (10)$$

Here, for PUCCH format 1, the expression $N_{symb}^{PUCCH}(i)$ is a number of symbols for the PUCCH transmission. Additionally, the expression $N_{ref}^{PUCCH}=N_{symb}^{slot}$, where $N_{symb}^{slot}$ is a total number of symbols per slot, such as 14. Moreover, the expression $\Delta_{UCI}(i)=10\ \log_{10}(O_{UCI}(i))$, where $O_{UCI}(i)$ is a number of UCI bits in PUCCH transmission occasion i.

When a UE transmits a PUCCH using PUCCH format 1 that indicates a combination of ACK and NACK values through a selection of a corresponding PUCCH resource, a resulting PUCCH reception reliability does not depend on a number of bits for the combination of ACK and NACK values when the PUCCH resources available for selection are orthogonal and the UE selects the PUCCH resource based on the values of the HARQ-ACK information bits. For example, a same power is required for a PUCCH transmission indicating a NACK value ($O_{UCI}(i)=1$) for a single TB reception using a first PUCCH resource as for a PUCCH transmission indicating a {NACK, ACK, ACK, NACK} value ($O_{UCI}(i)=4$) for respective reception of four TBs using a second PUCCH resource. Therefore, for a PUCCH transmission using PUCCH format 1 to indicate a combination of ACK and NACK values through PUCCH resource selection, $\Delta_{UCI}(i)$ is set to zero and $\Delta_{TF,b,f,c}(i)$ is modified as described in Equation (11).

$$\Delta_{TF,b,f,c}(i)=10\ \log_{10}(N_{ref}^{PUCCH}/N_{symb}^{PUCCH}(i)) \quad (11)$$

In case a number of PUCCH resources corresponds to N HARQ-ACK information bits, such as N=4, and the UE provides M<N HARQ-ACK information bits, in a first approach the UE can determine a PUCCH resource as the one corresponding to a predetermined value for the remaining N-M HARQ-ACK information bits, such as an ACK value. For example, for N=4, when the UE reports M=2 HARQ-ACK information bits with {NACK, ACK} value, the UE can select a PUCCH resource corresponding to a {NACK, ACK, ACK, ACK} value. In a second approach, a UE can be configured separate PUCCH resources to use based on a number of HARQ-ACK information bits that the UE provides. For example, the UE can be configured to use PUCCH resource 0 when the UE provides only one HARQ-ACK information bit (NACK), {PUCCH resource 1, PUCCH resource 2, PUCCH resource 3} when the UE provides only two HARQ-ACK information bits ({NACK, ACK}, {ACK, NACK}, {NACK, NACK}), and so on.

The method 900 of FIG. 9 illustrates an example procedure for a UE to determine a power for a PUCCH transmission with HARQ-ACK information when the PUCCH is according to a PUCCH format 1 depending on whether a PUCCH resource for the PUCCH transmission depends on the values of the HARQ-ACK information according to the disclosure In step 910, a UE (such as the UE 116) determines HARQ-ACK information to provide in a PUCCH transmission using PUCCH format 1. In step 920, the UE determines whether a PUCCH resource depends on HARQ-ACK values. When the UE determines a PUCCH resource that depends on the values of the HARQ-ACK information (as determined in step 920), the UE in step 930 determines a power for the PUCCH transmission independently of the number of the HARQ-ACK information bits. Alternatively, when the UE determines a PUCCH resource that does not depend on the values of the HARQ-ACK information (as determined in step 920), the UE in step 930 determines in step 940 a power for the PUCCH transmission based on a number of the HARQ-ACK information bits.

In certain embodiments, when a HARQ-ACK information report for a HARQ process number from a UE is disabled, for example by higher layers, and the UE receives a PDSCH with two TBs, a first of the two TBs is associated with a HARQ process number with disabled HARQ-ACK information report, and a second of the two TBs is associated with a HARQ process number with disabled HARQ-ACK information report.

In these embodiments, if the UE is configured to apply spatial bundling for the HARQ-ACK information corresponding to two TBs in a PDSCH, the UE generates HARQ-ACK information with ACK value for the first TB.

Additionally, if the UE is not configured to apply spatial bundling for the HARQ-ACK information corresponding to two TBs in a PDSCH, the UE generates HARQ-ACK information corresponding to a decoding outcome for the first TB or generates HARQ-ACK information with a predetermined value, such as a NACK value, for the first TB. For example, HARQ-ACK information with a predetermined value can be beneficial in improving a correct decoding outcome for a HARQ-ACK codebook that includes the HARQ-ACK information such as when the HARQ-ACK codebook size is smaller than 12 bits.

Additionally, in these embodiments, when a UE provides HARQ-ACK information according to a Type-2 HARQ-ACK codebook, values of a DAI field in a DCI format scheduling the PDSCH reception are incremented relative to corresponding values in a last DCI format that scheduled a PDSCH reception with a corresponding HARQ-ACK information report included in a same HARQ-ACK codebook.

In certain embodiments, when a UE provides HARQ-ACK information according to a Type-1 HARQ-ACK codebook and includes only HARQ-ACK information that is associated with PDSCH receptions scheduled by multicast DCI formats or SPS PDSCH receptions associated with G-RNTIs over $N_{cells}^{DL}$ serving cells in a HARQ-ACK codebook that the UE multiplexes in a PUCCH and assuming TB-based HARQ-ACK information, the UE determines a power for the PUCCH transmission using a PUCCH format 2,3, or 4 based on $n_{HARQ-ACK}$, which is described in Equation (12).

$$n_{HARQ-ACK} = \Sigma_{c=0}^{N_{cells}^{DL,G}-1} \Sigma_{m=0}^{M_{G,c}-1} N_{m,c}^{received} \qquad (12)$$

Here $M_{G,c}$ is a total number of occasions for PDSCH receptions or SPS PDSCH release in a set $M_{G,c}$ of occasions for PDSCH receptions or SPS PDSCH release for serving cell c. Additionally, for TB s with associated HARQ-ACK information, $N_{m,c}^{received}$ is a number of TBs the UE receives in PDSCH reception occasion m for serving cell c if the UE does not apply HARQ-ACK spatial domain bundling, or a number of PDSCH receptions if the UE applies HARQ-ACK spatial domain bundling, or a SPS PDSCH release in PDSCH reception occasion m for serving cell c.

When a UE provides HARQ-ACK information in a Type-1 HARQ-ACK codebook obtained based on corresponding to PDSCH receptions associated with first RNTIs, such as C-RNTI, MCS-C-RNTI or CS-RNTI, and based on PDSCH receptions associated with second RNTIs, such as G-RNTIs, and the UE multiplexes the Type-1 HARQ-ACK codebook in a PUCCH, and assuming for brevity TB-based HARQ-ACK information, the UE determines a power for the PUCCH transmission using a PUCCH format 2, 3, or 4 based on $n_{HARQ-ACK}$, which is described in Equation (13).

$$n_{HARQ-ACK} = \Sigma_{c=0}^{N_{cells}^{DL}-1} \Sigma_{m=0}^{M_c-1} N_{m,c}^{received} + \Sigma_{c=0}^{N_{cells}^{DL,G}-1} \Sigma_{m=0}^{M_{G,c}-1} N_{m,c}^{received} \qquad (13)$$

Here, the parameters are same as the ones for HARQ-ACK information for PDSCH receptions associated with a C-RNTI, MCS-C-RNTI, or CS-RNTI, and the ones for HARQ-ACK information for PDSCH receptions associated with G-RNTIs.

If the UE is not configured to either apply or to not apply HARQ-ACK spatial domain bundling for both HARQ-ACK information associated with G-RNTIs and HARQ-ACK information associated with a C-RNTI, MCS-C-RNTI, or CS-RNTI, then $n_{HARQ-ACK}$, is described in Equation (14).

$$n_{HARQ-ACK} = \Sigma_{c=0}^{N_{cells}^{DL,all}-1} \Sigma_{m=0}^{M_c^{all}-1} N_{m,c}^{received} \qquad (14)$$

Here $N_{cells}^{DL,all}$ is a union of serving cells where the UE can generate corresponding HARQ-ACK information, for example due to PDSCH receptions, associated with (for corresponding DCI formats or PDSCH receptions) a C-RNTI, MCS-C-RNTI, or CS-RNTI and HARQ-ACK information associated with G-RNTIs, and $M_c^{all}$ is a total number of occasions for PDSCH reception or SPS PDSCH release is a set $M_{A,c}^{all}$ of occasions for PDSCH reception or SPS PDSCH release for serving cell c resulting from a union of $M_{G,c}$ and $M_{A,c}$.

In certain embodiments, when a first HARQ-ACK codebook is unicast and a second HARQ-ACK codebook is multicast and both are of Type-1, a UE determines a power $P_{PUCCH,b,f,c}$ for a PUCCH transmission that includes the first and second HARQ-ACK codebooks based on Equation (1), subject to possible adjustments as described below, then $n_{HARQ-ACK}$ is described in Equation (15).

$$n_{HARQ-ACK} = \Sigma_{c=0}^{N_{cells}^{DL,UG}-1} \Sigma_{m=0}^{M_{c,UG}-1} N_{m,c}^{received} + \Sigma_{c=0}^{N_{cells}^{DL}-1} \Sigma_{m=0}^{M_c-1} N_{m,c}^{received} + \Sigma_{c=0}^{N_{cells}^{DL,G}-1} \Sigma_{m=0}^{M_{c,G}-1} N_{m,c}^{received} \qquad (15)$$

Here, $N_{cells}^{DL,UG}$ is a number of DL cells where a UE is configured to receive unicast PDSCH or multicast PDSCH, $M_{c,UG}$ is a total number of occasions for both unicast and multicast PDSCH receptions or SPS PDSCH releases for serving cell c corresponding to the HARQ-ACK information bits, $N_{cells}^{DL}$ is a number of DL cells where a UE is configured to receive unicast PDSCH and is not configured to receive multicast PDSCH, $M_c$ is a total number of occasions for unicast PDSCH receptions or SPS PDSCH releases for serving cell c corresponding to the HARQ-ACK information bits, and $N_{cells}^{DL}$ is a number of DL cells where a UE is configured to receive multicast PDSCH and is not configured to receive unicast PDSCH, $M_{c,G}$ is a total number of occasions for multicast PDSCH receptions or SPS PDSCH releases for serving cell c corresponding to the HARQ-ACK information bits.

For example, when the UE is configured to receive multicast PDSCH receptions only on a primary cell, as described in Equation (16), below, and for DCI formats the UE is configured to monitor PDCCH for serving cell c for both unicast and multicast PDSCH receptions, $M_{c,UG}$ can be determined based on a set of row indexes R of a TDRA table, provided by the union, or by any other method, of row indexes of TDRA tables associated with the DCI formats, and on a set of slot timing values $K_1$ provided by the union, or by any other method, of slot timing values $K_1$ associated with the DCI formats.

$$n_{HARQ-ACK} = \Sigma_{m=0}^{M_{0,UG}-1} N_{m,0}^{received} + \Sigma_{c=1}^{N_{cells}^{DL}-1} \Sigma_{m=0}^{M_c-1} N_{m,c}^{received} \qquad (16)$$

In certain embodiments, when a first HARQ-ACK codebook is unicast of Type-1 and one or more second HARQ-ACK codebooks are multicast of Type-2, a UE determines a power $P_{PUCCH,b,f,c}$ for a PUCCH transmission that includes the first and second HARQ-ACK codebooks as described in Equation (1), subject to possible later described adjustments, as described in Equation (17).

$$n_{HARQ-ACK} = \sum_{c=0}^{N_{cells}^{DL}-1} \sum_{m=0}^{M_c-1} N_{m,c}^{received} + \sum_{g=0}^{G-1} \left( \left( \left( V_{DAI,m_{last},g}^{DL} - \sum_{c=0}^{N_{cells,g}^{DL}-1} U_{DAI,c,g} \right) \right. \right.$$
$$\left. \left. mod(T_{D,g}) \right) N_{TB,max,g}^{DL} + \sum_{c=0}^{N_{cells,g}^{DL}-1} \left( \sum_{m=0}^{M_g-1} N_{m,c,g}^{received} + N_{SPS,c,g} \right) \right) \qquad (17)$$

Here $\Sigma_{c=0}^{N_{cells}^{DL}-1} \Sigma_{m=0}^{M_c-1} N_{m,c}^{received}$ is as described in Equation (4.2) for unicast HARQ-ACK information, G is a number of G-RNTIs configured to the UE, g is an index of a G-RNTI where the G-RNTIs are indexed in ascending order, $N_{cells,g}^{DL}$ is a number of DL cells that the UE is configured to receive PDSCH for G-RNTI g and for DCI formats or TBs with CRC scrambled by G-RNTI g.

As described in Equation (17), if $N_{cells,g}^{DL}=1$, $V_{DAI,m_{last,g}}^{DL}$ is the value of the counter DAI in a last DCI format that is associated with the HARQ-ACK information bits that the UE detects within the $M_g$ PDCCH monitoring occasions.

As described in Equation (17), if $N_{cells,g}^{DL}>1$ and if the UE does not detect any DCI format that includes a total DAI field in a last PDCCH monitoring occasion within the $M_g$ PDCCH monitoring occasions where the UE detects at least one DCI format with CRC scrambled by G-RNTI g for any serving cell c that is associated with the HARQ-ACK information bits, $V_{DAI,m_{last,g}}^{DL}$ is the value of the counter DAI in a last DCI format the UE detects.

As described in Equation (17), if $N_{cells,g}^{DL}>1$ and if the UE detects at least one DCI format that includes a total DAI field in a last PDCCH monitoring occasion within the $M_g$ PDCCH monitoring occasions where the UE detects at least one DCI format for any serving cell c that is associated with the HARQ-ACK information bits, $V_{DAI,m_{last,g}}^{DL}$ is the value of the total DAI in the at least one DCI format that includes a total DAI field.

As described in Equation (17), $V_{DAI,m_{last,g}}^{DL}=0$ if the UE does not detect any DCI format associated with the HARQ-ACK information bits for any serving cell c in any of the $M_g$ PDCCH monitoring occasions.

As described in Equation (17), $U_{DAI,c,g}$ is the total number of DCI formats associated with the HARQ-ACK information bits that the UE detects within the $M_g$ PDCCH monitoring occasions for serving cell c. $U_{DAI,c,g}=0$ if the UE does not detect any DCI format associated with the HARQ-ACK information bits for serving cell c in any of the $M_g$ PDCCH monitoring occasions.

As described in Equation (17), $T_{D,g}=2^{N_{C-DAI,g}^{DL}}$ where $N_{C-DAI,g}^{DL}$ is a number of bits for a counter DAI field in the DCI formats.

As described in Equation (17), $N_{TB,max,g}^{DL}=2$ if the UE is configured to receive a maximum of 2 TBs per PDSCH for any serving cell c and spatial domain bundling of HAR-ACK information bits does not apply; otherwise, $N_{TB,max,g}^{DL}=1$.

As described in Equation (17), $N_{m,c,g}^{received}$ is the number of TBs the UE receives in a PDSCH scheduled by a DCI format that the UE detects in PDCCH monitoring occasion m for serving cell c when there is no spatial bundling of HARQ-ACK information, or the number of PDSCH scheduled by a DCI format that the UE detects in PDCCH monitoring occasion m for serving cell c when there is spatial bundling of HARQ-ACK information, or the number of DCI formats that the UE detects in PDCCH monitoring occasion m for serving cell c that do not schedule PDSCH reception and are associated with HARQ-ACK information.

As described in Equation (17), $N_{SPS,c,g}$ is the number of SPS PDSCH receptions for G-RNTI g by the UE on serving cell c for which the UE transmits corresponding HARQ-ACK information in the same PUCCH as for HARQ-ACK information corresponding to PDSCH receptions within the $M_g$ PDCCH monitoring occasions.

For example, for multicast PDSCH receptions only on one cell ($N_{cells,g}^{DL}=1$), such as a primary cell, $n_{HARQ-ACK}$ is described in Equation (18).

$$n_{HARQ-ACK} = \sum_{c=0}^{N_{cells}^{DL}-1} \sum_{m=0}^{M_c-1} N_{m,c}^{received} + \sum_{g=0}^{G-1}((V_{DAI,m_{last,g}}^{DL} - U_{DAI,g}) \bmod(T_{D,g})) \cdot N_{TB,max,g}^{DL} + (\sum_{m=0}^{M_g-1} N_{m,g}^{received} + N_{SPS,g})) \quad (18)$$

When the first HARQ-ACK codebook is unicast of Type-2 and the second HARQ-ACK codebook is multicast of Type-1, the UE determines a power $P_{PUCCH,b,f,c}$ for a PUCCH transmission that includes the first and second HARQ-ACK codebooks as described in Equation (1), as shown in Equation (19).

$$n_{HARQ-ACK} = \sum_{c=0}^{N_{cells}^{DL,G}-1} \sum_{m=0}^{M_c,G-1} N_{m,c}^{received} + ((V_{DAI,m_{last}}^{DL} - \sum_{c=0}^{N_{cells}^{DL}-1} U_{DAI,c}) \bmod(T_D)) \cdot N_{TB,max}^{DL} + \sum_{c=0}^{N_{cells}^{DL}-1} (\sum_{m=0}^{M-1} N_{m,c}^{received} + N_{SPS,c}) \quad (19)$$

Here, the respective parameters are defined in Equation (6) and Equation (15).

In certain embodiments, when a UE (such as the UE 116) provides HARQ-ACK information according to a Type-2 HARQ-ACK codebook and a DCI format indicates to a UE to not provide HARQ-ACK information for a corresponding PDSCH reception, the UE assumes that values of a DAI field in the DCI format are not incremented relative to corresponding values in a last DCI format that scheduled a PDSCH reception with a corresponding HARQ-ACK information report included in a same Type-2 HARQ-ACK codebook.

When a UE provides HARQ-ACK information according to a Type-2 HARQ-ACK codebook and HARQ-ACK information report for a set of HARQ process numbers is disabled, wherein the set of HARQ process numbers can be provided for example by higher layers, and the UE receives a PDSCH with TBs associated only with HARQ process numbers from the set of HARQ process numbers (i) the UE does not generate HARQ-ACK information for the TBs and (ii) values of a DAI field in a DCI format scheduling the PDSCH reception are not incremented relative to corresponding values in a last DCI format that scheduled a PDSCH reception with a corresponding HARQ-ACK information report.

A reception in a same PDSCH of a first TB associated with a HARQ process number from a set of HARQ process numbers that the UE is indicated to not provide HARQ-ACK information, and of a second TB associated a HARQ process number that is not from the set of HARQ process numbers, can be either precluded in the specification of a system operation (a scheduler of a serving gNB is constrained to avoid such scheduling and a UE does not expect such scheduling) or can be allowed. For example, when a UE provides HARQ-ACK information according to a Type-2 HARQ-ACK codebook and the UE receives a PDSCH with a first TB associated with a HARQ process number from the set of HARQ process numbers and with a second TB associated a HARQ process number that is not from the set of HARQ process numbers, the UE generates HARQ-ACK information for a decoding outcome of the first TB when HARQ-ACK spatial bundling is not enabled. Additionally, for the first TB, the UE generates HARQ-ACK information with ACK value when HARQ-ACK spatial bundling is enabled. In this example, the UE generates HARQ-ACK information for a decoding outcome of the second TB. Additionally, in this example, values of a DAI field in a DCI format scheduling the PDSCH reception are incremented relative to corresponding values in a last DCI format that scheduled a PDSCH reception with a corresponding HARQ-ACK information report.

When a UE includes HARQ-ACK information in a Type-2 HARQ-ACK codebook corresponding to DCI formats or SPS PDSCHs associated with G-RNTIs over $N_{cells}^{DL,G}$ DL serving cells and the UE multiplexes the Type-2 HARQ-ACK codebook in a PUCCH, and assuming for brevity TB-based HARQ-ACK information, the UE determines a power for the PUCCH transmission using a PUCCH format 2, 3, or 4 based on $n_{HARQ-ACK}$, as described in Equation (20), below.

$$n_{HARQ-ACK} = n_{HARQ-ACK,TB,G} = ((V_{DAI,m_{last}}^{DL,G} - \sum_{c=0}^{N_{cells}^{DL,G}} U_{DAI,c})(T_D))N_{TB,max}^{DL,G} + \sum_{c=0}^{N_{cells}^{DL,G}-1} (\sum_{m=0}^{M_G-1} N_{m,c}^{received} + N_{SPS,c}) \quad (20)$$

As described in Equation (20), $T_{D,G} = 2^{N_{C-DAI}^{DL,G}}$ where $N_{C-DAI}^{DL,G}$ is a number of bits for a counter DAI field in the multicast DCI format. Additionally, if $N_{cells}^{DL,G}=1$, $V_{DAI,m_{last}}^{DL,G}$ is a value of a counter DAI field in a last multicast DCI format scheduling PDSCH reception or indicating SPS PDSCH release for any serving cell c that the UE detects wherein $M_G$ is the cardinality of a set of PDCCH monitoring occasions for multicast DCI formats associated with the Type-2 HARQ-ACK codebook.

As described in Equation (20), if $N_{cells}^{DL,G}>1$ and if the UE does not detect any multicast DCI format that includes a total DAI field in a last PDCCH monitoring occasion within the $M_G$ PDCCH monitoring occasions where the UE detects at least one multicast DCI format scheduling PDSCH reception having associated HARQ-ACK information or indicating SPS PDSCH release for any serving cell c, $V_{DAI,m_{last}}^{DL,G}$ is the value of a counter DAI field in a last multicast DCI format the UE detects in the last PDCCH monitoring occasion.

As described in Equation (20), if $N_{cells}^{DL,G}>1$ and if the UE detects at least one multicast DCI format that includes a total DAI field in a last PDCCH monitoring occasion within the $M_G$ PDCCH monitoring occasions where the UE detects at least one multicast DCI format scheduling PDSCH reception having associated HARQ-ACK information or indicating SPS PDSCH release for any serving cell c, $V_{DAI,m_{last}}^{DL,G}$ is a value of the total DAI field in the at least one multicast DCI format that includes a total DAI field.

As described in Equation (20), $V_{DAI,m_{last}}^{DL,G}=0$ if the UE does not detect any multicast DCI format scheduling PDSCH reception having associated HARQ-ACK information or indicating SPS PDSCH release for any serving cell c in any of the $M_G$ PDCCH monitoring occasions.

As described in Equation (20), $U_{G-DAI,c}$ is a total number of multicast DCI formats scheduling PDSCH receptions having associated HARQ-ACK information or indicating SPS PDSCH release that the UE detects within the $M_G$ PDCCH monitoring occasions for serving cell c. Here, $U_{G-DAI,c}$ can exclude multicast DCI formats that indicate to the UE to not provide HARQ-ACK information report. A serving gNB can additionally be assumed to not increment DAI values in such DCI formats. Additionally, $U_{G-DAI,c}$ can exclude multicast DCI formats scheduling PDSCH receptions that include only TBs associated with numbers of HARQ processes that are configured with disabled HARQ-ACK information report. Moreover, $U_{DAI,c}=0$ if the UE does not detect any multicast DCI format scheduling PDSCH reception or indicating SPS PDSCH release for serving cell c in any of the M PDCCH monitoring occasions.

As described in Equation (20), $N_{TB,max}^{DL,G}=2$ if a maximum number of TBs having associated HARQ-ACK information that can be provided in a PDSCH reception scheduled by a multicast DCI format is 2 for any serving cell c and the UE does not apply HARQ-ACK spatial domain bundling; otherwise, $N_{TB,max}^{DL,G}=1$.

As described in Equation (20), $N_{m,c}^{received}$ is a number of TBs having associated HARQ-ACK information that the UE receives in a PDSCH scheduled by a multicast DCI format that the UE detects in PDCCH monitoring occasion m for serving cell c if the UE does not apply HARQ-ACK spatial domain bundling, or a number of PDSCHs having associated HARQ-ACK information scheduled by a multicast DCI format that the UE detects in PDCCH monitoring occasion m for serving cell c if the UE applies HARQ-ACK spatial domain bundling, or a number of multicast DCI formats that the UE detects and indicate SPS PDSCH release in PDCCH monitoring occasion m for serving cell c.

As described in Equation (20), $N_{SPS,c}$ is a number of SPS PDSCH receptions by the UE on serving cell c for which the UE transmits corresponding HARQ-ACK information in a same PUCCH as for HARQ-ACK information corresponding to PDSCH receptions having associated HARQ-ACK information scheduled by a multicast DCI format within the $M_G$ PDCCH monitoring occasions.

In certain embodiments, when a UE provides HARQ-ACK information by concatenating a first Type-2 HARQ-ACK codebook corresponding to DCI formats or SPS PDSCHs associated with first RNTIs, such as C-RNTI, MCS-C-RNTI or CS-RNTI, and a second Type-2 HARQ-ACK codebook corresponding to DCI formats or SPS PDSCHs associated with second RNTIs, such as G-RNTIs, and the UE multiplexes the HARQ-ACK information in a PUCCH, and assuming for brevity TB-based HARQ-ACK information, the UE determines a power for the PUCCH transmission using a PUCCH format 2, 3, or 4 based on $n_{HARQ-ACK}$, as described in Equation (21).

$$n_{HARQ-ACK} = n_{HARQ-ACK,TB} + n_{HARQ-ACK,TB,G} = \\ ((V_{DAI,m_{last}}^{DL} - \sum_{c=0}^{N_{cells}^{DL}-1} U_{DAI,c})(T_D))N_{TB,max}^{DL} + ((V_{DAI,m_{last}}^{DL,G} - \\ \sum_{c=0}^{N_{cells}^{DL,G}-1} U_{G-DAI,c}) mod(T_{D,G}))N_{TB,max}^{DL,G} + \sum_{c=0}^{N_{cells}^{DL}-1} \\ (\sum_{m=0}^{M-1} N_{m,c}^{received} + N_{SPS,c}) + \\ \sum_{c=0}^{N_{cells}^{DL,G}-1} (\sum_{m=0}^{M_G-1} N_{m,c}^{received} + N_{SPS,c}) \quad (21)$$

Here, the parameters are same as the ones for HARQ-ACK information associated with DCI formats with CRC scrambled by a C-RNTI, MCS-C-RNTI, and CS-RNTI, and the ones for HARQ-ACK information associated with DCI formats with CRC scrambled by G-RNTIs.

In certain embodiments, when a UE provides HARQ-ACK information by concatenating a Type-1 HARQ-ACK codebook corresponding to either PDSCH receptions associated with first RNTIs, such as C-RNTI, MCS-C-RNTI or CS-RNTI, or second RNTIs, such as G-RNTIs, and a Type-2 HARQ-ACK codebook corresponding to either receptions of DCI formats or PDSCHs associated with first RNTIs, such as C-RNTI, MCS-C-RNTI or CS-RNTI, or second RNTIs, such as G-RNTIs, and the UE multiplexes the HARQ-ACK information in a PUCCH, and assuming for brevity TB-based HARQ-ACK information, the UE determines a power for the PUCCH transmission using a PUCCH format 2, 3, or 4 based on $n_{HARQ-ACK}$, as described in Equation (22.1) or Equation (22.2).

$$n_{HARQ-ACK} = \\ ((V_{DAI,m_{last}}^{DL} - \sum_{c=0}^{N_{cells}^{DL}-1} U_{DAI,c})(T_D))N_{TB,max}^{DL} + \\ \sum_{c=0}^{N_{cells}^{DL,G}-1} \sum_{m=0}^{M_{G,c}-1} N_{m,c}^{received} \quad (22.1)$$

-continued $$n_{HARQ-ACK} = \quad (22.2)$$
$$\left(\left(V_{DAI,m_{last}}^{DL,G} - \sum_{k=0}^{N_{cells}^{DL,G}-1} U_{G-DAI,c}\right) mod(T_{D,G})\right) N_{TB,max}^{DL,G} +$$
$$\sum_{k=0}^{N_{cells}^{DL}-1} \sum_{m=0}^{M_c-1} N_{m,c}^{received}$$

It is noted that in Equations (22.1) and (22.2) the parameters are same as the ones for HARQ-ACK information associated with DCI formats with CRC scrambled by a C-RNTI, MCS-C-RNTI, and CS-RNTI, and the ones for HARQ-ACK information associated with DCI formats with CRC scrambled by G-RNTIs.

The method 1000 of FIG. 10 illustrates an example procedure for a UE to determine a PUCCH transmission power when the UE is configured to concatenate a first Type-2 HARQ-ACK codebook and a second Type-2 HARQ-ACK codebook and a total number of HARQ-ACK information bits is smaller than twelve according to embodiments of this disclosure.

In step 1010, a UE (such as the UE 116) is configured to provide HARQ-ACK information based on a concatenation of first and second Type-2 HARQ-ACK codebooks. In step 1020, the UE is also configured first and second PDCCH monitoring occasions, and first and second occasions for SPS PDSCH receptions, for first $N_{cells}^{DL}$ DL cells and second $N_{cells}^{DL,G}$ DL cells, wherein the UE includes corresponding HARQ-ACK information in the first and second Type-2 HARQ-ACK codebooks, respectively. In step 1030, the UE computes $n_{HARQ-ACK,TB}$ as described in Equation (23), below. Additionally, in step 1040, the UE computes $n_{HARQ-ACK,TB,G}$ as described in Equation (24), below. In step 1050, the UE multiplexes the HARQ-ACK information in a PUCCH and transmits the PUCCH using a power that the UE determines based on combining Equation (23) with Equation (24) as described in Equation (25), below.

$$n_{HARQ-ACK,TB} = \quad (23)$$
$$\left(\left(V_{DAI,m_{last}}^{DL} - \sum_{k=0}^{N_{cells}^{DL}-1} U_{DAI,c}\right) mod(T_D)\right) N_{TB,max}^{DL} +$$
$$\sum_{k=0}^{N_{cells}^{DL}-1} \left(\sum_{m=0}^{M-1} N_{m,c}^{received} + N_{SPC,c}\right)$$

$$n_{HARQ-ACK,TB,G} = \quad (24)$$
$$\left(\left(V_{DAI,m_{last}}^{DL,G} - \sum_{k=0}^{N_{cells}^{DL,G}-1} U_{G-DAI,c}\right) mod(T_{D,G})\right) N_{TB,max}^{DL,G} +$$
$$\sum_{k=0}^{N_{cells}^{DL,G}-1} \left(\sum_{m=0}^{M_g-1} N_{m,c}^{received} + N_{SPS,c}\right)$$

$$n_{HARQ-ACK} = n_{HARQ-ACK,TB} + n_{HARQ-ACK,TB,G}. \quad (25)$$

In certain embodiments, when the first HARQ-ACK codebook is unicast and the second one or more HARQ-ACK codebooks are multicast and all are of Type-2, a UE determines a power $P_{PUCCH,b,f,c}$ for a PUCCH transmission that includes the first and the one or more second HARQ-ACK codebooks of Equation (1), as described in Equation (26).

$$n_{HARQ-ACK} = \left(\left(V_{DAI,m_{last}}^{DL} - \sum_{k=0}^{N_{cells}^{DL}-1} U_{DAI,c}\right) mod(T_D)\right) N_{TB,max}^{DL} + \quad (26)$$
$$\sum_{k=0}^{N_{cells}^{DL}-1} \left(\sum_{m=0}^{M-1} N_{m,c}^{received} + \right.$$

-continued
$$\left. N_{SPS,c}\right) +$$
$$\sum_{g=0}^{G-1} \left(\left(\left(V_{DAI,m_{last},g}^{DL} - \sum_{k=0}^{N_{cells,g}^{DL}-1} U_{DAI,c,g}\right) mod(T_{D,g})\right) N_{TB,max,g}^{DL} + \right.$$
$$\left. \sum_{k=0}^{N_{cells,g}^{DL}-1} \left(\sum_{m=0}^{M_g-1} N_{m,c,g}^{received} + N_{SPS,c,g}\right)\right)$$

Here, respective parameters are defined in Equation (6) and Equation (17).

It is noted that multicast PDSCH receptions on a single cell such as a primary cell, Equation (26) simplifies to Equation (27).

$$n_{HARQ-ACK} = \quad (27)$$
$$\left(\left(V_{DAI,m_{last}}^{DL} - \sum_{k=0}^{N_{cells}^{DL}-1} U_{DAI,c}\right) mod(T_D)\right) N_{TB,max}^{DL} +$$
$$\sum_{k=0}^{N_{cells}^{DL}-1} \left(\sum_{m=0}^{M-1} N_{m,c}^{received} + N_{SPS,c}\right) +$$
$$\sum_{g=0}^{G-1} \left(\left((V_{DAI,m_{last},g}^{DL} - U_{DAI,g}) mod(T_{D,g})\right) N_{TB,max,g}^{DL} + \right.$$
$$\left. \sum_{m=0}^{M_g-1} N_{m,0,g}^{received} + N_{SPS,0,g}\right)$$

The method 1100 of FIG. 11 illustrates an example procedure for a UE to determine a power for a PUCCH transmission that includes jointly encoded first Type-1 HARQ-ACK codebook and second Type-2 HARQ-ACK codebook according to embodiments of this disclosure.

In step 1110, a UE (such as the UE 116) receives information to provide a Type-1 HARQ-ACK codebook for multicast PDSCH receptions (associated with G-RNTIs) and a Type-2 HARQ-ACK codebook for unicast PDSCH receptions (associated with a C-RNTI). In step 1120, the UE determines that a total number of HARQ-ACK information bits for the Type-1 and Type-2 HARQ-ACK codebooks is more than 2 and less than 12. In step 1130, the UE determines a first number of received TBs having associated HARQ-ACK information associated with the Type-1 HARQ-ACK codebook and a second number of received TBs having associated HARQ-ACK information and a maximum number of TBs having associated HARQ-ACK information that the UE did not receive associated with the Type-2 HARQ-ACK codebook. In step 1140, the UE jointly encodes and multiplexes in a PUCCH the Type-1 and Type-2 HARQ-ACK codebooks. In step 1150, the UE determines a power for the PUCCH transmission based on the first number of received TB, the second number of received TBs, and the maximum number of TBs.

In certain embodiments, for a Type-1 HARQ-ACK codebook, when a UE (such as the UE 116) is not configured by higher layers to provide HARQ-ACK for a G-RNTI $g_x$, the slot timing values $K_1$ and the row indexes of a TDRA table associated with G-RNTI $g_x$ are excluded from the determination of $M_{c,G}$. When the UE is configured by higher layers to provide HARQ-ACK for the G-RNTI $g_x$, the slot timing values $K_1$ and the row indexes of a TDRA table associated with G-RNTI $g_x$ are included in the determination of $M_{c,G}$ and the UE provides HARQ-ACK information for a TB reception outcome even when a DCI format scheduling the TB reception indicates disabling of a HARQ-ACK report for the TB. In such case, the HARQ-ACK information for the TB can be an actual value indicating a correct or incorrect reception outcome for the TB, as determined based on a check of the CRC for the TB, or can be a predetermined value such as a NACK. The latter option can be restricted to apply when a total number of HARQ-ACK bits that are jointly encoded is larger than 2 and smaller than 12. This is because then the encoding is by a Reed-Muller code and it is beneficial for the reception/decoding reliability of the encoded HARQ-ACK information when some bits values are predetermined/known at a serving gNB.

In certain embodiments, for a Type-2 HARQ-ACK codebook, when a UE is not configured by higher layers to provide HARQ-ACK information for a G-RNTI $g_x$, the UE excludes $g_x$ when computing the value of $\Sigma_{g=0}^{G-1}(\ )$, for example in Equation 7 or Equation 8. When the UE is configured by higher layers to provide HARQ-ACK for the G-RNTI $g_x$ and is indicated by a DCI format scheduling a multicast PDSCH reception (or a multicast SPS activation/release) on serving cell c to not provide associated HARQ-ACK information, the UE does not count the DCI format in determining $U_{DAL,c,g}$ and does not count a TB from the multicast PDSCH reception in $N_{m,c,g}^{received}$ for $g=g_x$. For SPS PDSCH receptions, if the UE is indicated by the DCI format activating the SPS PDSCH reception for a given SPS PDSCH configuration to not provide HARQ-ACK information, the UE does not count (sets to zero) the $N_{SPS,c,g}$ for $g=g_x$ and for the corresponding SPS configuration on serving cell c. If the UE is indicated by higher layers to not provide HARQ-ACK information for $g=g_x$ and for the corresponding SPS configuration, the UE does not count (sets to zero) the $N_{SPS,c,g}$ regardless of an indication by the DCI format, when any, to provide or not provide HARQ-ACK information.

For an example, when a DCI format scheduling multicast PDSCH receptions provides an indication to a UE to provide or to not provide an associated HARQ-ACK information report, and for DCI formats or TBs with CRC scrambled by G-RNTI g, when $N_{cells}^{DL}=1$ or when the UE does not detect any DCI format that includes a total DAI field in a last PDCCH monitoring occasion within the $M_g$ PDCCH monitoring occasions where the UE detects at least one DCI format for any serving cell c that is associated with the HARQ-ACK information bits, the value of $V_{DAI,m_{last},g}^{DL}$ can be the value of the counter DAI in the last DCI format that is associated with the HARQ-ACK information bits that the UE detects within the $M_g$ PDCCH monitoring occasions and indicates to the UE to provide associated HARQ-ACK information. Alternatively, the value of $V_{DAI,m_{last},g}^{DL}$ can be the value of the counter DAI in the last DCI format that is associated with the HARQ-ACK information bits that the UE detects within the $M_g$ PDCCH monitoring occasions, independently of an indication in the DCI format for the UE to provide or not provide associated HARQ-ACK information. Additionally, in this example, if $N_{cells}^{DL}>1$ and the UE detects at least one DCI format that includes a total DAI field in a last PDCCH monitoring occasion within the $M_g$ PDCCH monitoring occasions where the UE detects at least one DCI format for any serving cell c that is associated with the HARQ-ACK information bits, the value of $V_{DAI,m_{last},g}^{DL}$ can be the value of the total DAI in the at least one DCI format that includes a total DAI field and indicates to the UE to provide associated HARQ-ACK information. Alternatively, the value of $V_{DAI,m_{last},g}^{DL}$ can be the value of the total DAI in the at least one DCI format that includes a total DAI field independently of an indication in the DCI format for the UE to provide or not provide associated HARQ-ACK information.

In certain embodiments, a UE determines an association between (i) a first DCI format that indicates to the UE to not provide associated HARQ-ACK information and (ii) HARQ-ACK information in a PUCCH that is triggered by a second DCI format, based on a slot determined by a first slot timing value $K_1$ provided by the first DCI format being same as a slot determined by a second slot timing value $K_1$ provided by the second DCI format. In case the DCI format can be provided by PDCCH that can be received from more than one TRPs and the UE is configured to separately provide HARQ-ACK information to the two TRPs in respective separate PUCCH transmissions in a slot, a CORESET pool index provided by coresetPoolIndex for a CORESET of the PDCCH receptions for the first and second DCI format should also be same.

The above two options for a DCI format providing a counter DAI value or a total DAI value can also apply for the determination of a Type-2 HARQ-ACK codebook. In the first option, a UE considers counter/total DAI values only in DCI formats that indicate to the UE to provide associated HARQ-ACK information. In the second option, the UE considers counter/total DAI values in all DCI formats; however, for any DCI format that indicates to the UE to not provide an associated HARQ-ACK information, the UE does not include the HARQ-ACK information in the Type-2 HARQ-ACK codebook.

The method 1200 of FIG. 12 illustrates an example procedure for a UE to determine a power for a PUCCH transmission depending on an HARQ-ACK codebook type when a DCI format scheduling a PDSCH reception can indicate to the UE to provide or not provide associated HARQ-ACK information according to the disclosure.

In step 1210, a UE (such as the UE 116) UE receives information to generate a HARQ-ACK codebook of Type 1 or of Type 2. In step 1220, the UE receives DCI formats scheduling PDSCH receptions wherein a DCI format indicates to the UE to provide or not provide associated HARQ-ACK information. In step 1230, the UE determines, encodes, and multiplexes in a PUCCH the HARQ-ACK codebook for the indicated type. In step 1240, the UE determines whether the HARQ-ACK codebook is of Type-1. When the HARQ-ACK codebook is of Type-1 (as determined in step 1240), the UE in step 1250 determines a power for the PUCCH transmission without considering an indication in any DCI format for the UE to provide or not provide associated HARQ-ACK information, at least when a number of bits for the Type-1 HARQ-ACK codebook is larger than or equal to 12. Alternatively, when the HARQ-ACK codebook is of Type-2 (as determined in step 1240), the UE in step 1260 determines the power for the PUCCH transmission by considering the indications in all respective DCI formats to provide or not provide associated HARQ-ACK information.

In certain embodiments, a UE (such as the UE 116) does not provide a PHR for a PUCCH transmission with unicast UCI when a PHR for a PUCCH can be determined from a PHR for a PUSCH on a same serving cell such as a primary cell. However, as the TPC commands are separate for the PUCCH and the PUSCH, and the UE can fail to detect DCI formats providing TPC commands for a PUSCH transmission or for a PUCCH transmission, a PHR for a PUCCH cannot be, in general, accurately derived from a PHR of the PUSCH.

To enable a PHR for a PUCCH transmission to be derived from a PHR of a PUSCH transmission, a CLPC adjustment state can be same. That is feasible because, for a same serving cell such as a primary cell, a channel medium in an active UL BWP for the PUSCH transmissions and the PUCCH transmissions is same and short-term fading variations can be addressed by a same CLPC adjustment state value for a given power adjustment state l. Another benefit of having same values for a CLPC adjustment state for PUSCH transmissions and for PUCCH transmissions is that more TPC commands are typically available and an accuracy/update rate of the CLPC adjustment state can improve. Therefore, a UE can jointly process TPC commands in DCI formats scheduling PDSCH receptions and triggering PUCCH transmissions with associated HARQ-ACK information with TPC commands in DCI formats scheduling PUSCH receptions, such as summing all those TPC commands for a same CLPC adjustment state, and a CLPC adjustment state $g_{b,f,c}(l)$ can be common for PUCCH and PUSCH transmissions. The commonality of the CLPC adjustment state can also be extended to SRS transmissions. The commonality of the CLPC adjustment state can be based on configuration by the gNB, wherein the gNB indicates whether TPC commands in DCI formats scheduling PDSCH receptions are jointly or separately processed with TPC commands in DCI formats scheduling PUCCH transmissions, or whether TPC commands in a DCI format 2_2 that does not schedule a PDSCH reception or a PUSCH transmission are processed for only one or for both of PDSCH receptions or PUSCH transmissions.

For a PUCCH transmission with multicast HARQ-ACK information from a UE when a CLPC adjustment state is not used to determine a respective power, a PHR can be determined based on a reference signal received power (RSRP) report or the UE can provide a value of a CLPC state, such as for l=0, in addition to or instead of a PHR for PUCCH transmissions.

The method 1300 of FIG. 13 illustrates an example procedure for a UE to determine a power for a PUCCH transmission based on TPC commands received in DCI formats scheduling PDSCH receptions or PUSCH transmissions according to embodiments of this disclosure.

In step 1310, a UE (such as the UE 116) receives information for whether to jointly or separately process TPC commands provided by first DCI formats scheduling PDSCH receptions and by second DCI formats scheduling PUSCH transmissions. In step 1320, the UE determines whether the information indicates joint processing. When the information indicates joint processing (as determined in step 1320), the UE in step 1330 determines a power for a PUCCH or PUSCH transmission by jointly processing TPC commands provided by the first and second DCI formats. Alternatively, when the information does not indicate joint processing (as determined in step 1320), the UE in step 1340 determines a power for the PUCCH transmission based only on the TPC commands provided by the first DCI formats and a power for the PUSCH transmission based only on the TPC commands provided by the second DCI formats.

Although FIG. 8 illustrates the method 800, FIG. 9 illustrates the method 900, FIG. 10 illustrates the method 1000, FIG. 11 illustrates the method 1100, FIG. 12 illustrates the method 1200, and FIG. 13 illustrates the method 1300, various changes may be made to FIGS. 8-13. For example, while the methods 800-1300 are shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure describe enabling or disabling a HARQ-ACK information report according to a HARQ-ACK codebook type. This is described in the following examples and embodiments, such as those of FIGS. 14 and 15. That is, embodiments of the disclosure considers a procedure to enable repetitions for a first PUCCH transmission with HARQ-ACK information associated with a first DCI format with CRC scrambled by one of first RNTIs, such as a C-RNTI, MCS-C-RNTI or CS-RNTI, and for a second PUCCH transmission with HARQ-ACK information associated with a second DCI format with CRC scrambled by one of second RNTIs, such as a G-RNTI.

Figure 14:
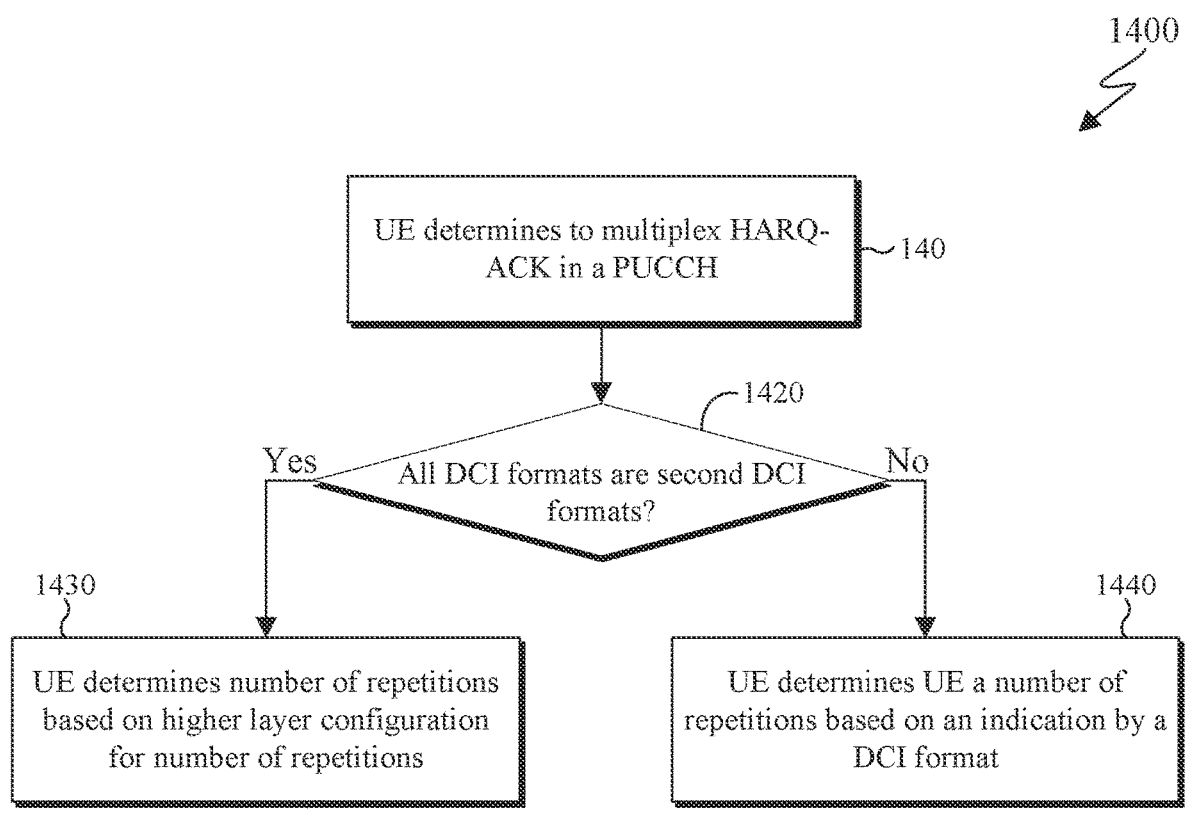
FIG. 14 illustrates a method for a UE to determine a number of repetitions for a PUCCH transmission with HARQ-ACK information according to embodiments of the present disclosure.
Figure 15:
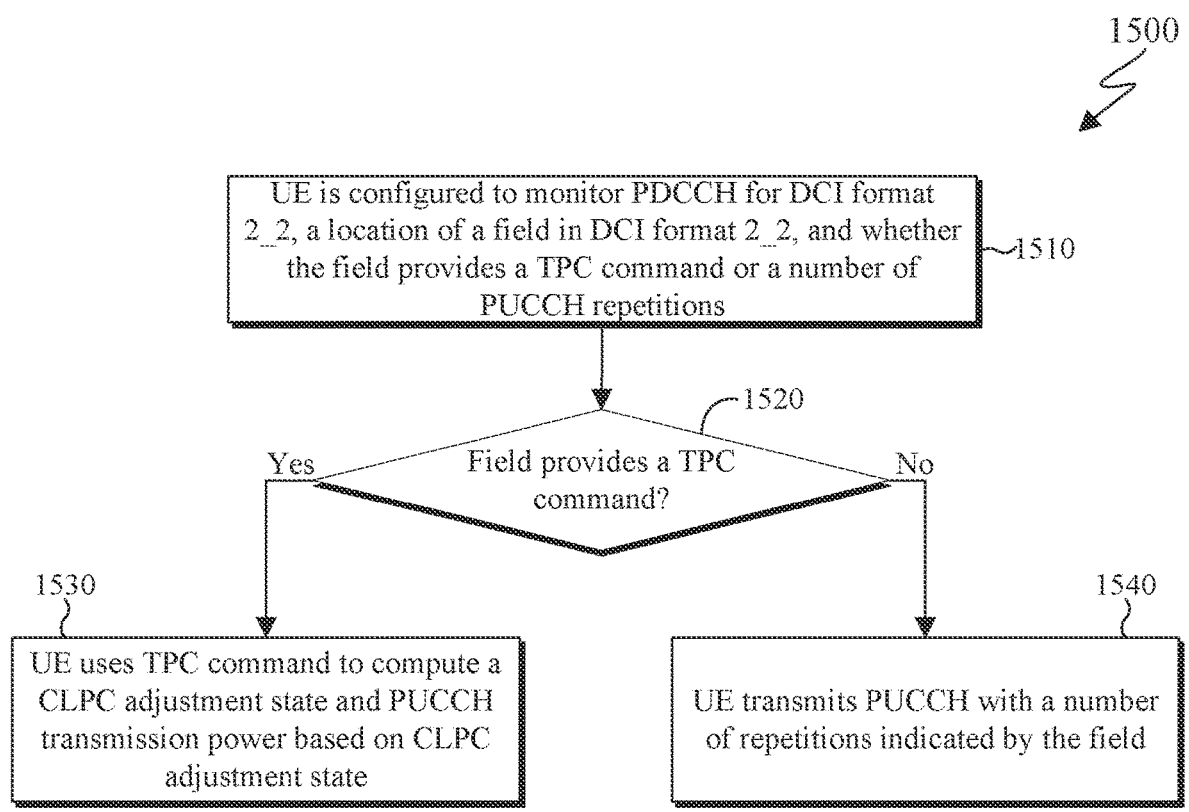
FIG. 15 illustrates a method for a UE to determine a number of repetitions or a value of a transmission power control (TPC) command for a PUCCH transmission according to embodiments of the present disclosure.

FIG. 14 illustrates a method 1400 for a UE to determine a number of repetitions for a PUCCH transmission with HARQ-ACK information according to embodiments of the present disclosure. FIG. 15 illustrates a method 1500 for a UE to determine a number of repetitions or a value of a TPC command for a PUCCH transmission according to embodiments of the present disclosure.

The steps of the method 1400 of FIG. 14 and the method 1500 of FIG. 15 can be performed by any of the UEs 111-119 of FIG. 1, such as the UE 116 of FIG. 3. The methods 1400 and 1500 are for illustration only and other embodiments can be used without departing from the scope of the present disclosure.

In certain embodiments, a DCI format from the first DCI formats schedules a PDSCH reception or a SPS PDSCH release to a single UE and can provide an indication for a number of repetitions of a PUCCH transmission with corresponding HARQ-ACK information. For example, the indication can be by an explicit field in the DCI format that indicates a number of repetitions, either based on a value of the field, such as 1, 2, 4, or 8, or by indicating a number of repetitions from a configured set of number of repetitions, or by indicating a PUCCH resource, wherein a number of repetitions is one of the parameters of the PUCCH resource. For a second DCI format that schedules a PDSCH reception to multiple UEs, such as a DCI format with CRC scrambled by a G-RNTI, a UE-specific indication for a number of repetitions of a PUCCH transmission by the UE is not generally possible in practice. Therefore, when a UE transmits a PUCCH with HARQ-ACK information that is only associated with the second DCI format, a number of repetitions for the PUCCH transmission needs to be indicated to the UE by other means.

In a first approach, a number of repetitions for a PUCCH transmission that includes only HARQ-ACK information associated with receptions of second DCI formats with CRC scrambled by G-RNTIs is provided by higher layers. The number of repetitions can be applicable to any UCI payload provided by the PUCCH or can be restricted to be applicable when the UCI payload is above a threshold, wherein the threshold can also be provided by higher layers. A number of repetitions for a PUCCH transmission that includes HARQ-ACK information associated with receptions of first DCI formats and can also include HARQ-ACK information associated with receptions of second DCI formats, is indicated by a last of the first DCI formats that is correctly received by the UE. Ordering of the DCI formats is according to a start time of a corresponding PDCCH reception and, in case of same start time, according to a cell index for a corresponding scheduled PDSCH reception.

The method 1400 of FIG. 14 illustrates an example procedure for a UE to determine a number of repetitions for a PUCCH transmission with HARQ-ACK information according to embodiments of this disclosure.

In step 1410, a UE (such as the UE 116) determines to multiplex HARQ-ACK information in a PUCCH, wherein the HARQ-ACK information is associated with a number of DCI formats. In step 1420, the UE determines whether all DCI formats are second DCI formats with CRC scrambled by G-RNTI or whether at least one DCI format from the number of DCI formats is a first DCI format with CRC scrambled for example by a C-RNTI. When all DCI formats are second DCI formats (as determined in step 1420), the UE in step 1430 determines a number of repetitions based on a higher layer configuration for the number of repetitions. Alternatively, when at least one DCI format from the number of DCI formats is a first DCI format (as determined in step 1420), the UE in step 1440 determines a number of repetitions based on an indication by the at least one DCI format. For example, the at least one DCI format is a last received DCI format from the first DCI formats.

In a second approach, a UE can be configured to monitor PDCCH for detection of a DCI format 2_2 with CRC scrambled by a TPC-PUCCH-RNTI wherein a field for the UE in the DCI format 2_2 can provide either a TPC command or provide a number of repetitions for a PUCCH transmission by the UE. The field can additionally include an identifier bit for whether a value is a TPC command or a number of repetitions for a PUCCH transmission or the UE can be configured by higher layers whether to interpret the field either as providing a TPC command value or as providing a number of repetitions for a subsequent PUCCH transmission. When the field in the DCI format 2_2 provides a number of repetitions for a PUCCH transmission, the UE transmits the PUCCH with a power determined using a previous/last value a closed-loop power control adjustment state $g_{b,f,c}$. Alternatively, the UE can transmit the PUCCH with a maximum power $P_{CMAX,f,c}$.

The method 1500 of FIG. 15 illustrates an example procedure for a UE to determine a number of repetitions or a value of a TPC command for a PUCCH transmission according to embodiments of this disclosure.

In step 1510, a UE (such as the UE 116) UE receives a configuration to monitor PDCCH for detection of a DCI format 2_2 with CRC scrambled by a TPC-PUCCH-RNTI, a location of a field in the DCI format 2_2, and whether the field provides a TPC command value or a number of repetitions for a PUCCH transmission. In step 1520, the UE receives a DCI format 2_2 with CRC scrambled by TPC-PUCCH-RNTI and determines whether the field provides a TPC command. For a next PUCCH transmission, when the field provides a TPC command value (as determined in step 1520), the UE in step 1530 uses the value of the field as a TPC command value for computing a CLPC adjustment state $g_{b,f,c}$ and the UE determines a power for the PUCCH transmission based on the CLPC adjustment state $g_{b,f,c}$. When the field provides a number of repetitions (as determined in step 1520), the UE in step 1540 transmits the PUCCH with a number of repetitions indicated by the field.

Although FIG. 14 illustrates the method 1400 and FIG. 15 illustrates the method 1500 various changes may be made to FIGS. 14 and 15. For example, while the method 1400 and the method 1500 are shown as a series of steps, various steps could overlap, occur in parallel, occur in a different order, or occur multiple times. In another example, steps may be omitted or replaced by other steps. For example, steps of the method 1400 and the method 1500 can be executed in a different order.

Embodiments of the present disclosure describe a resolution for overlapping between a PUCCH transmission triggered by incorrect TB receptions and other PUCCH transmissions. This is described in the following examples and embodiments, such as those of FIG. 16. That is, embodiments of the disclosure considers mechanisms for r multiplexing HARQ-ACK codebooks in a PUSCH depending on a DCI fort at that schedules the PUSCH.

Figure 16:
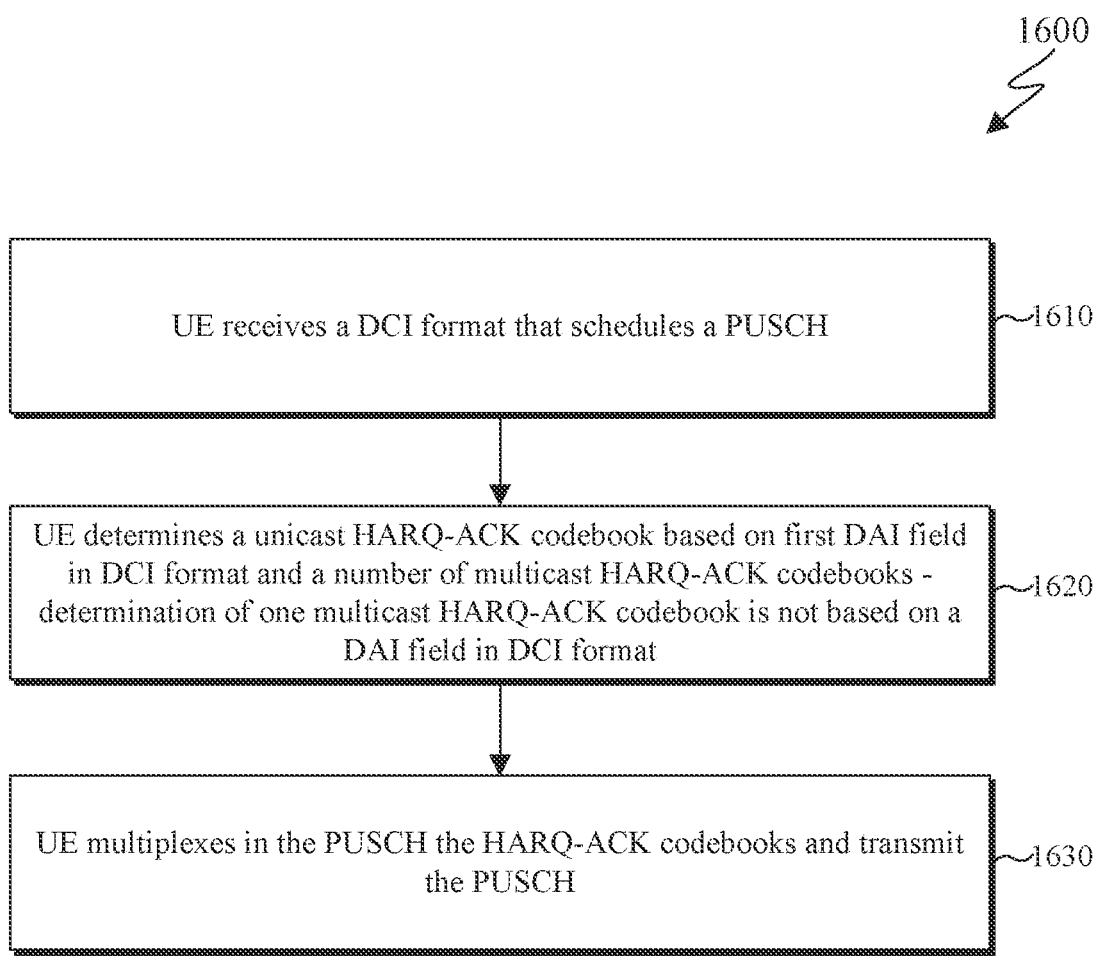
FIG. 16 illustrates a method for a UE to multiplex a unicast Type-2 HARQ-ACK codebook and one or more multicast Type-2 HARQ-ACK codebooks in a PUSCH according to embodiments of the present disclosure.

FIG. 16 illustrates a method 1600 for a UE to multiplex a unicast Type-2 HARQ-ACK codebook and one or more multicast Type-2 HARQ-ACK codebooks in a PUSCH according to embodiments of the present disclosure. The steps of the method 1600 of FIG. 16 can be performed by any of the UEs 111-119 of FIG. 1, such as the UE 116 of FIG. 3. The method 1600 is for illustration only and other embodiments can be used without departing from the scope of the present disclosure.

In a first case, a UE (such as the UE 116) is configured a unicast Type-1 HARQ-ACK codebook (corresponding to unicast PDSCH receptions) and a multicast Type-1 HARQ-ACK codebook (corresponding to multicast PDSCH receptions). For example, the UE generates a single Type-1 HARQ-ACK codebook for both unicast and multicast PDSCH receptions. A DAI field in a DCI format indicates to the UE whether or not to multiplex the Type-1 HARQ-ACK codebook in the PUSCH in a same manner as when the Type-1 HARQ-ACK codebook is only for unicast PDSCH receptions.

In a second case, a UE (such as the UE 116) has a unicast Type-1 or Type-2 HARQ-ACK codebook and one or more multicast Type-2 HARQ-ACK codebooks for respective one or more G-RNTIs. A first mechanism for a UE to multiplex the multicast Type-2 HARQ-ACK codebooks in a PUSCH is for a DCI format scheduling the PUSCH to include $N_G$ DAI fields of 1 or 2 bits, for respective $N_G$ G-RNTIs, providing a total DAI value, as described in REF 3, for each of the respective $N_G$ multicast Type-2 HARQ-ACK codebooks.

A second mechanism fora UE (such as the UE 116) to multicast Type-2 HARQ-ACK codebooks in a PUSCH is for a DCI format scheduling a PUSCH transmission to include $M_G$ DAI fields of 1 or 2 bits for respective $N_G$ G-RNTIs, wherein $0 \leq M_G < N_G$, providing a total DAI value as described in REF 3 for each of the respective $N_G$ multicast Type-2 HARQ-ACK codebooks. For multicast Type-2 HARQ-ACK codebooks without a corresponding DAI field in the DCI format due to $M_G < N_G$, the multicast HARQ-ACK codebook determination is same as when multiplexing is in a PUCCH. When $M_G > 0$, the multicast Type-2 HARQ-ACK codebooks with a corresponding DAI field in the DCI format can be determined according to an ascending order to the G-RNTI index, such as the ones corresponding to the first $M_G$ from the $N_G$ G-RNTIs or can be indicated by higher layer signaling. When a DCI format 0_0 (does not include a DAI field) schedules the PUSCH transmission, $M_G=0$.

In a third case, a UE (such as the UE 116) has a multicast Type-1 HARQ-ACK codebook and a unicast Type-2 HARQ-ACK codebook. A first mechanism for a UE to multiplex the multicast Type-1 HARQ-ACK codebook in a PUSCH is for a DCI format scheduling the PUSCH to include a 1-bit DAI field indicating to the UE whether or not to multiplex the multicast Type-1 HARQ-ACK codebook in the PUSCH. A second mechanism is for the DCI format to include a DAI field only for the unicast Type-2 HARQ-ACK codebook and for the determination for multiplexing the multicast Type-1 HARQ-ACK codebook to be based on whether or not the UE would multiplex the multicast Type-1 HARQ-ACK codebook in a PUCCH if there was no PUSCH.

The method 1600 of FIG. 16 illustrates an example procedure for a UE to multiplex a unicast Type-2 HARQ-ACK codebook and one or more multicast Type-2 HARQ-ACK codebooks in a PUSCH according to embodiments of this disclosure.

In step 1610, a UE (such as the UE 116) receives a DCI format that schedules a PUSCH transmission. In step 1620, the UE determines a unicast HARQ-ACK codebook based on a first DAI field in the DCI format and a number of multicast HARQ-ACK codebooks wherein a determination of a multicast HARQ-ACK codebook from the number of multicast HARQ-ACK codebooks is not based on a DAI field in the DCI format. For example, all HARQ-ACK codebooks are of Type-2.

In step 1630, the UE multiplexes in the PUSCH the HARQ-ACK codebooks and transmits the PUSCH. The multiplexing in the PUSCH can be due to an overlapping of a PUCCH, where the UE would otherwise multiplex the HARQ-ACK codebooks, with the PUSCH.

For configured-grant (CG) PUSCH transmissions or for PUSCH transmissions scheduled by a DCI format that does not include a DAI field, it is not possible for a gNB (such as the BS 102) to indicate to a UE (such as the UE 116) to multiplex HARQ-ACK information in a PUSCH. Then, the UE determines a HARQ-ACK information to multiplex in the PUSCH to be same as a HARQ-ACK information that the UE would multiplex in a PUCCH that the UE does not transmit due to a time overlapping with the PUSCH. Such multiplexing can lead to error events where the UE multiplexes a smaller number of HARQ-ACK than expected by the gNB due to the UE failing to detect a few last received DCI formats. For a FDD system, where HARQ-ACK information is typically reported per slot, the UE can fail to multiplex HARQ-ACK information in a PUSCH that corresponds to 1-2 TBs scheduled by a single DCI format, particularly in case of single cell operation. A same situation can apply for a TDD system when a UE does not have PDSCH receptions in consecutive skits. When the UE reports unicast HARQ-ACK information, the UE reserves a number of REs in a PUSCH for reporting of up to 2 HARQ-ACK information bits. When the UE also reports multicast HARQ-ACK information for $N_G$ G-RNTIs, the UE can reserve an additional number of REs corresponding to an additional number of HARQ-ACK information bits, wherein the additional number of HARQ-ACK information bits can depend on the value of $N_G$, such as be proportional to $N_G$ or the total number of HARQ-ACK information bits for determining a number of reserved REs can be configured to the UE by the gNB through higher layer signaling.

Although FIG. 16 illustrates the method 1600 various changes may be made to FIG. 16. For example, while the method 1600 is shown as a series of steps, various steps could overlap, occur in parallel, occur in a different order, or occur multiple times. In another example, steps may be omitted or replaced by other steps. For example, steps of the method 1600 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   determining:
     a sum of:
       a first number of received transport blocks (TBs) associated with a first set of radio network temporary identifiers (RNTIs),
       a second number of received TBs associated with a second set of RNTIs, and
       a third number of non-received TBs associated with the second set of RNTIs, and
     a power for a physical uplink control channel (PUCCH) transmission based on the sum, wherein the PUCCH includes first hybrid automatic repeat request acknowledgement (HARQ-ACK) information bits associated with the first set of RNTIs and second HARQ-ACK information bits associated with the second set of RNTIs; and
   transmitting the PUCCH using the power.

2. The method of claim 1, further comprising:
   determining:
     a set of numbers of received TBs per RNTI from the second set of RNTIs, and
     a set of numbers of non-received TBs per RNTI from the second set of RNTIs, wherein:
       the second number of received TBs is a sum of the numbers from the set of numbers of received TB s,
       the third number of non-received TB s is a sum of the numbers from the set of numbers of non-received TBs, and
       the second set of RNTIs includes more than one RNTI.

3. The method of claim 2, wherein:
   the first number of received TBs is zero, and
   a number of the first HARQ-ACK information bits is zero.

4. The method of claim 1, further comprising:
   transmitting the PUCCH with a number of repetitions over a number of slots using a resource, wherein:
     when the resource is determined based on a first downlink control information (DCI) format associated with a RNTI from the first set of RNTIs, the number of repetitions is indicated by the first DCI format, and
     when the resource is determined based on a second DCI format associated with a RNTI from the second set of RNTIs, the number of repetitions is indicated by radio resource control (RRC) signaling.

5. The method of claim 4, further comprising:
   receiving more than one physical downlink control channels (PDCCHs) that provide respective more than one DCI formats scheduling the first number of received TB s, and
   the first DCI format is provided by a PDCCH, from the more than one PDCCHs, that starts last among the more than one PDCCHs.

6. The method of claim 1, further comprising determining:
the first HARQ-ACK information bits according to a Type-1 HARQ-ACK codebook, and
the second HARQ-ACK information bits according to a Type-2 HARQ-ACK codebook.

7. The method of claim 1, further comprising encoding jointly the first HARQ-ACK information bits and the second HARQ-ACK information bits using a Reed-Muller code, wherein a sum of a number of the first HARQ-ACK information bits and of a number of the second HARQ-ACK information bits is smaller than 12.

8. The method of claim 1, further comprising:
determining the power based on a value of closed loop power control (CLPC) adjustment state that is a sum of transmission power control (TPC) values, wherein a TPC command value:
is provided by each downlink control information (DCI) format associated with the first set of RNTIs, and
is not provided by any DCI format associated with the second set of RNTIs.

9. The method of claim 8, wherein:
the CLPC adjustment state is a first CLPC adjustment state or a second CLPC adjustment state when a number of the first HARQ-ACK information bits is not zero, and
the CLPC adjustment state is the first CLPC adjustment state when the number of the first HARQ-ACK information bits is zero.

10. The method of claim 1, wherein the first set of RNTIs is associated with unicast communications and the second set of RNTIs is associated with multicast communications.

11. A user equipment (UE) comprising:
a processor configured to determine:
a sum of:
a first number of received transport blocks (TBs) associated with a first set of radio network temporary identifiers (RNTIs),
a second number of received TBs associated with a second set of RNTIs, and
a third number of non-received TBs associated with the second set of RNTIs; and
a power for a physical uplink control channel (PUCCH) transmission based on the sum, wherein the PUCCH includes first hybrid automatic repeat request acknowledgement (HARQ-ACK) information bits associated with the first set of RNTIs and second HARQ-ACK information bits associated with the second set of RNTIs; and
a transceiver operably coupled to the processor, the transceiver configured to transmit the PUCCH using the power.

12. The UE of claim 11, wherein:
the processor is further configured to determine:
a set of numbers of received TBs per RNTI from the second set of RNTIs, and
a set of numbers of non-received TBs per RNTI from the second set of RNTIs,
the second number of received TBs is a sum of the numbers from the set of numbers of received TBs, the third number of non-received TBs is a sum of the numbers from the set of numbers of non-received TBs, and
the second set of RNTIs includes more than one RNTI.

13. The UE of claim 12, wherein:
the first number of received TBs is zero, and
a number of the first HARQ-ACK information bits is zero.

14. The UE of claim 11, wherein:
the transceiver is further configured to transmit the PUCCH with a number of repetitions over a number of slots using a resource,
when the resource is determined based on a first downlink control information (DCI) format associated with a RNTI from the first set of RNTIs, the number of repetitions is indicated by the first DCI format, and
when the resource is determined based on a second DCI format associated with a RNTI from the second set of RNTIs, the number of repetitions is indicated by radio resource control (RRC) signaling.

15. The UE of claim 14, wherein:
the transceiver is further configured to receive more than one physical downlink control channels (PDCCHs) that provide respective more than one DCI formats scheduling the first number of received TBs, and
the first DCI format is provided by a PDCCH, from the more than one PDCCHs, that starts last among the more than one PDCCHs.

16. The UE of claim 11, wherein the processor is further configured to determine:
the first HARQ-ACK information bits according to a Type-1 HARQ-ACK codebook, and
the second HARQ-ACK information bits according to a Type-2 HARQ-ACK codebook.

17. The UE of claim 11, further comprising an encoder configured to encode jointly the first HARQ-ACK information bits and the second HARQ-ACK information bits using a Reed-Muller code, wherein a sum of a number of the first HARQ-ACK information bits and of a number of the second HARQ-ACK information bits is smaller than 12.

18. The UE of claim 11, wherein:
the processor is further configured to determine the power based on a value of closed loop power control (CLPC) adjustment state that is a sum of transmission power control (TPC) values, and
a TPC command value:
is provided by each downlink control information (DCI) format associated with the first set of RNTIs, and
is not provided by any DCI format associated with the second set of RNTIs.

19. The UE of claim 18, wherein:
the CLPC adjustment state is a first CLPC adjustment state or a second CLPC adjustment state when a number of the first HARQ-ACK information bits is not zero, and
the CLPC adjustment state is the first CLPC adjustment state when the number of the first HARQ-ACK information bits is zero.

20. The UE of claim 11, wherein the first set of RNTIs is associated with unicast communications and the second set of RNTIs is associated with multicast communications.

* * * * *